United States Patent Office 3,184,159
Patented May 18, 1965

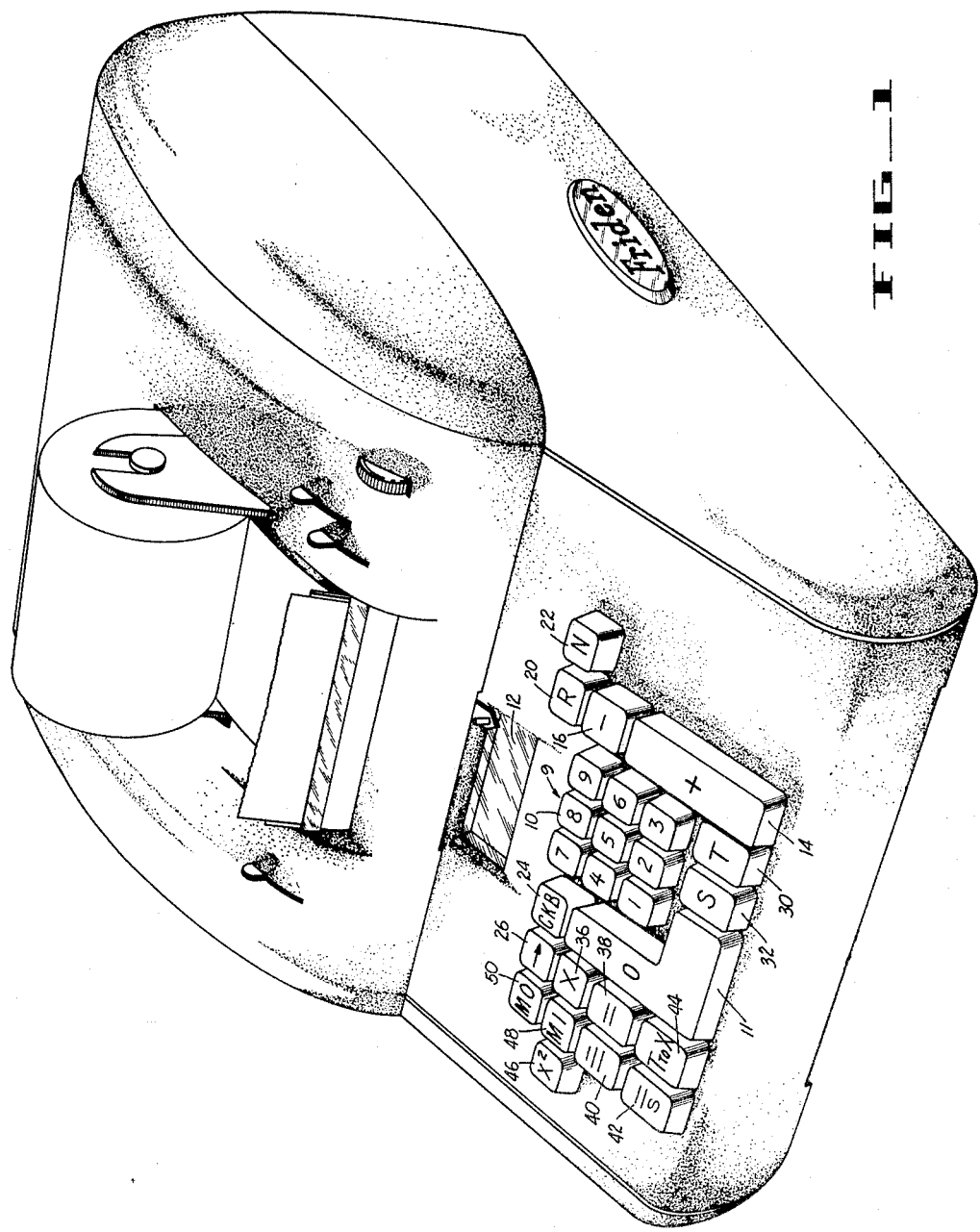

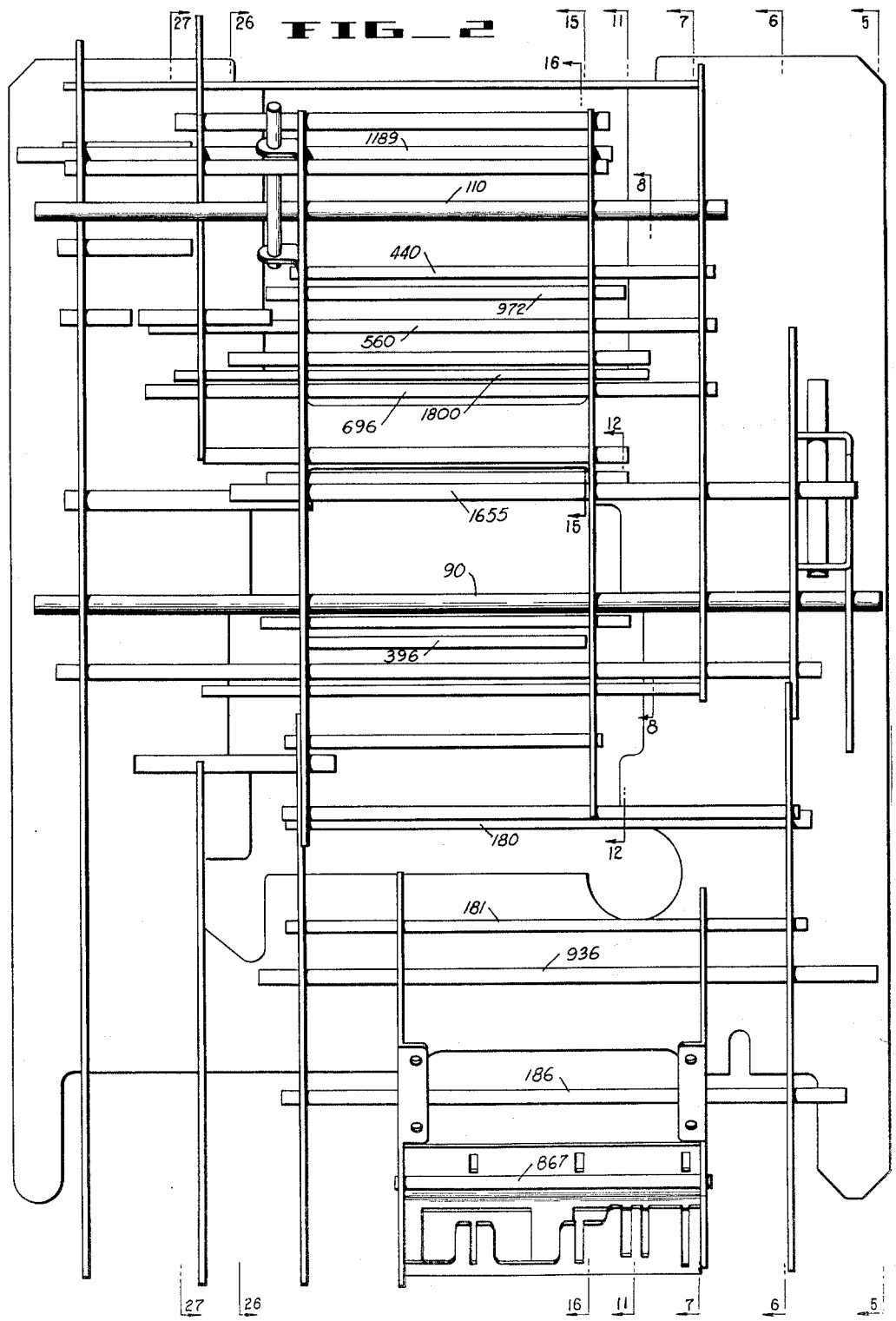

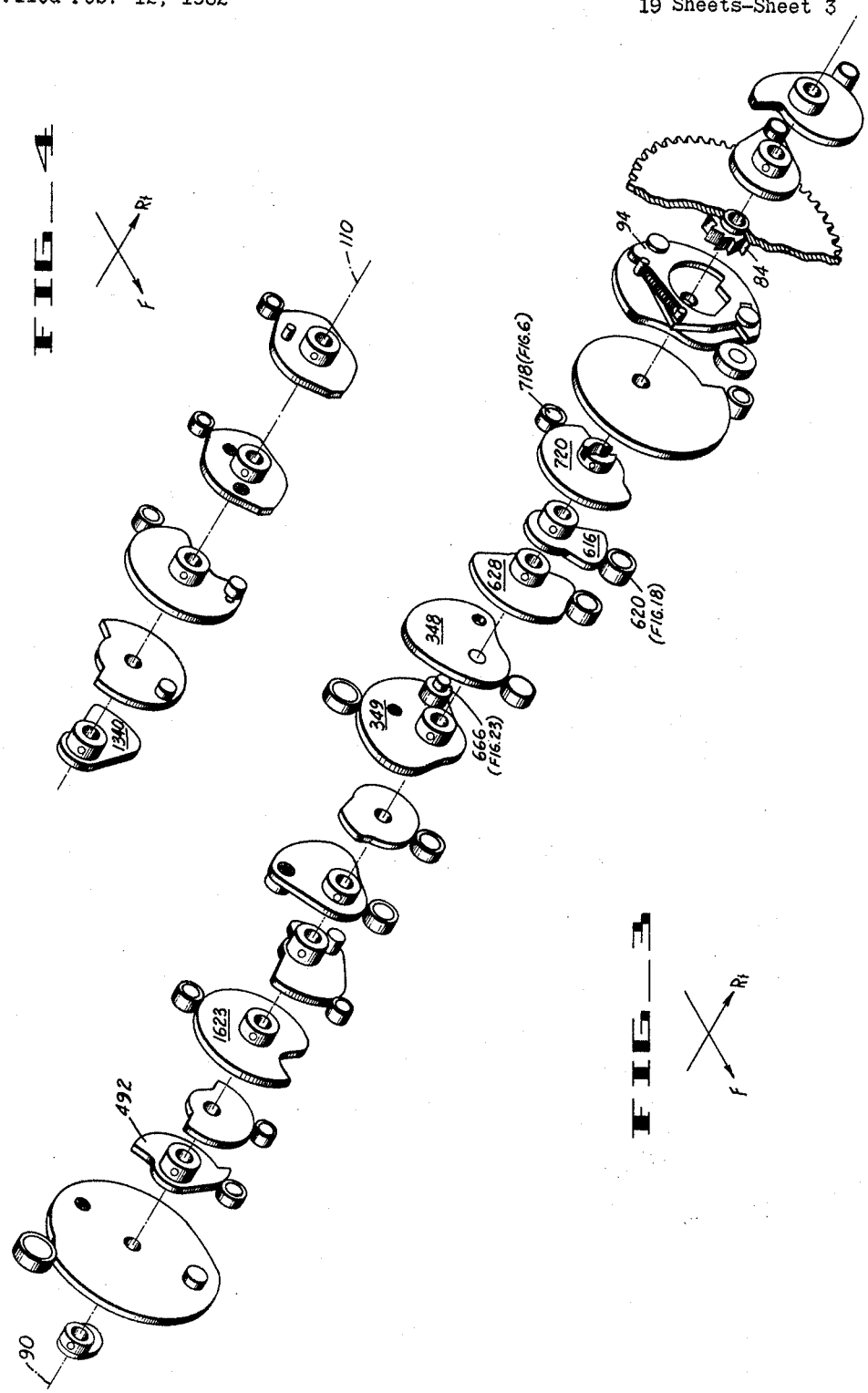

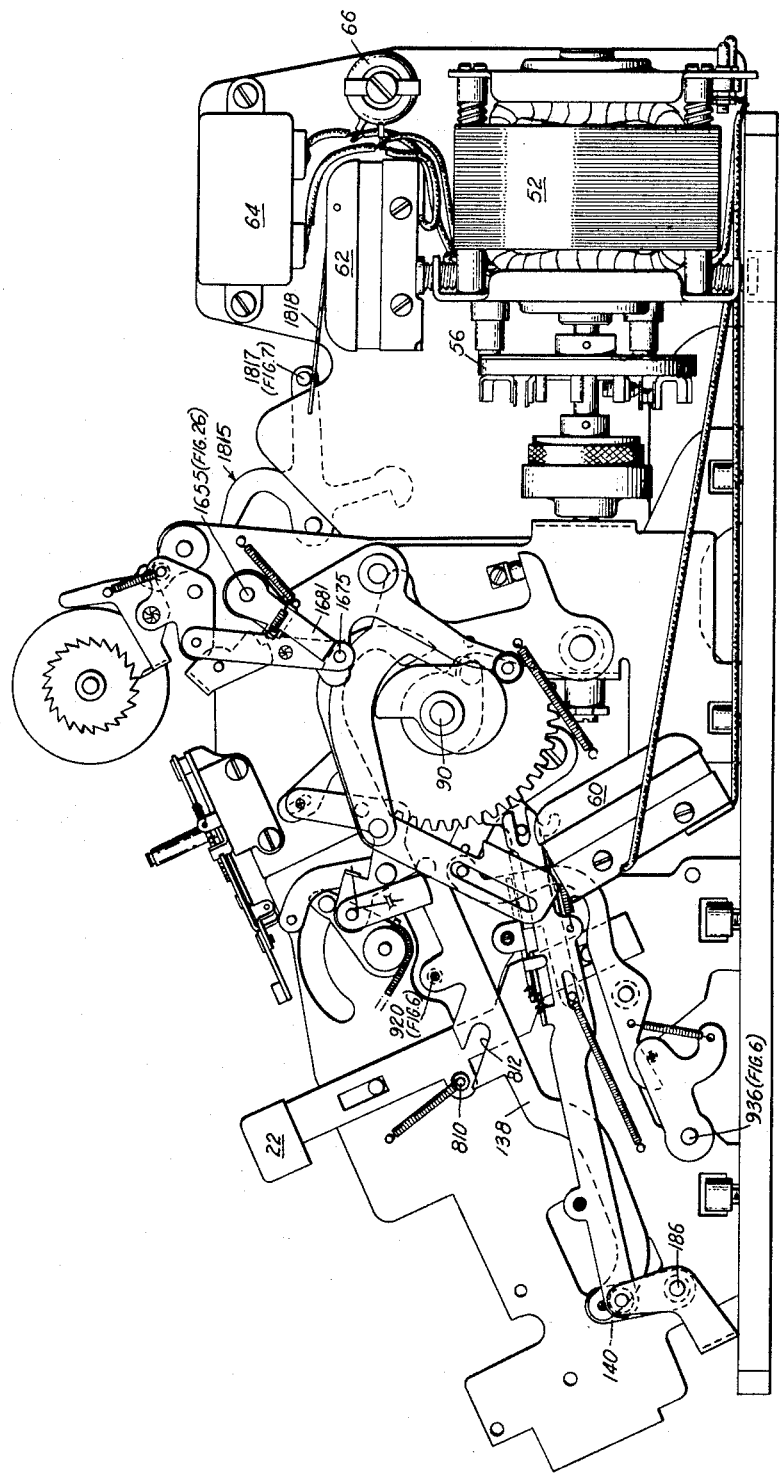

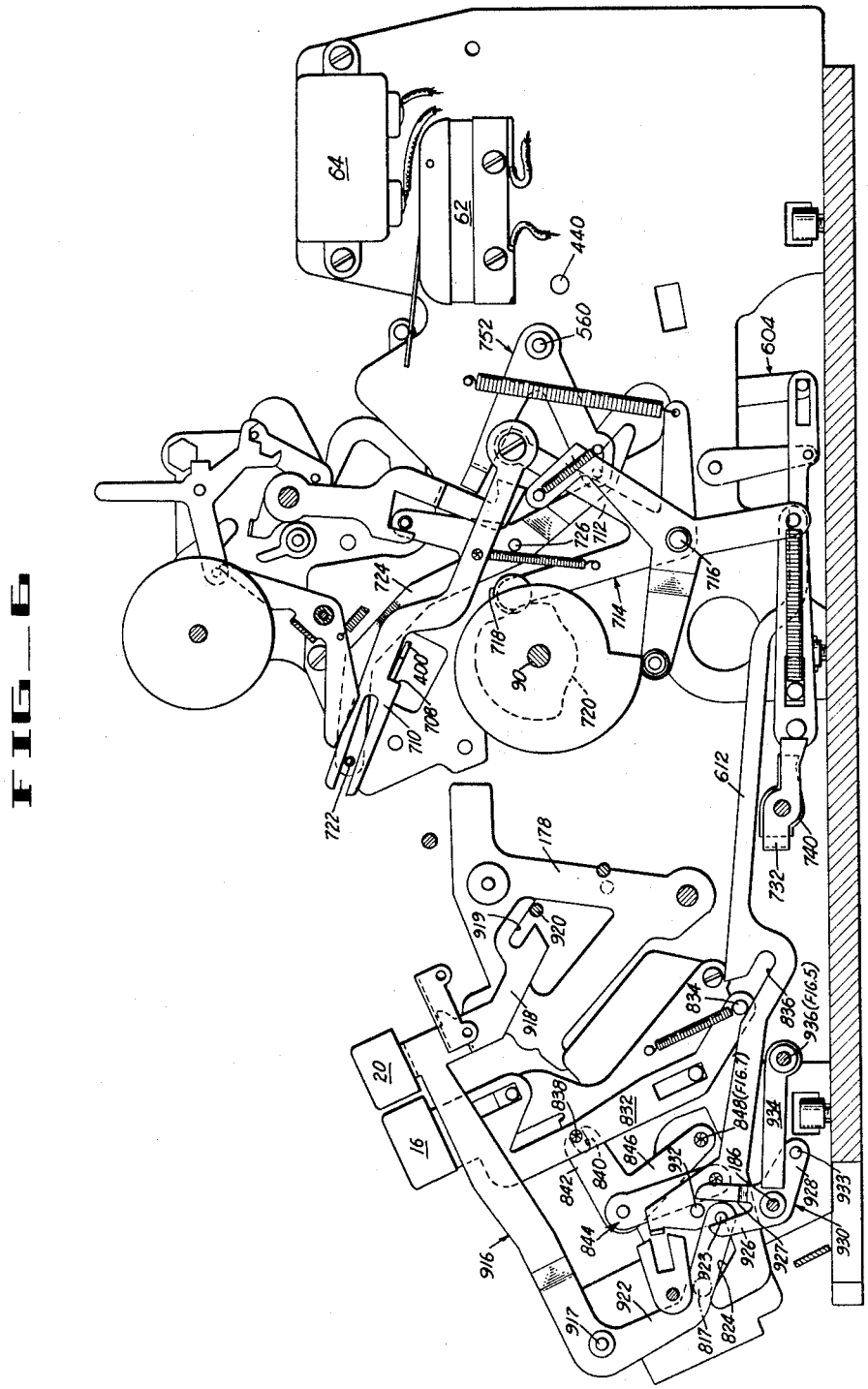

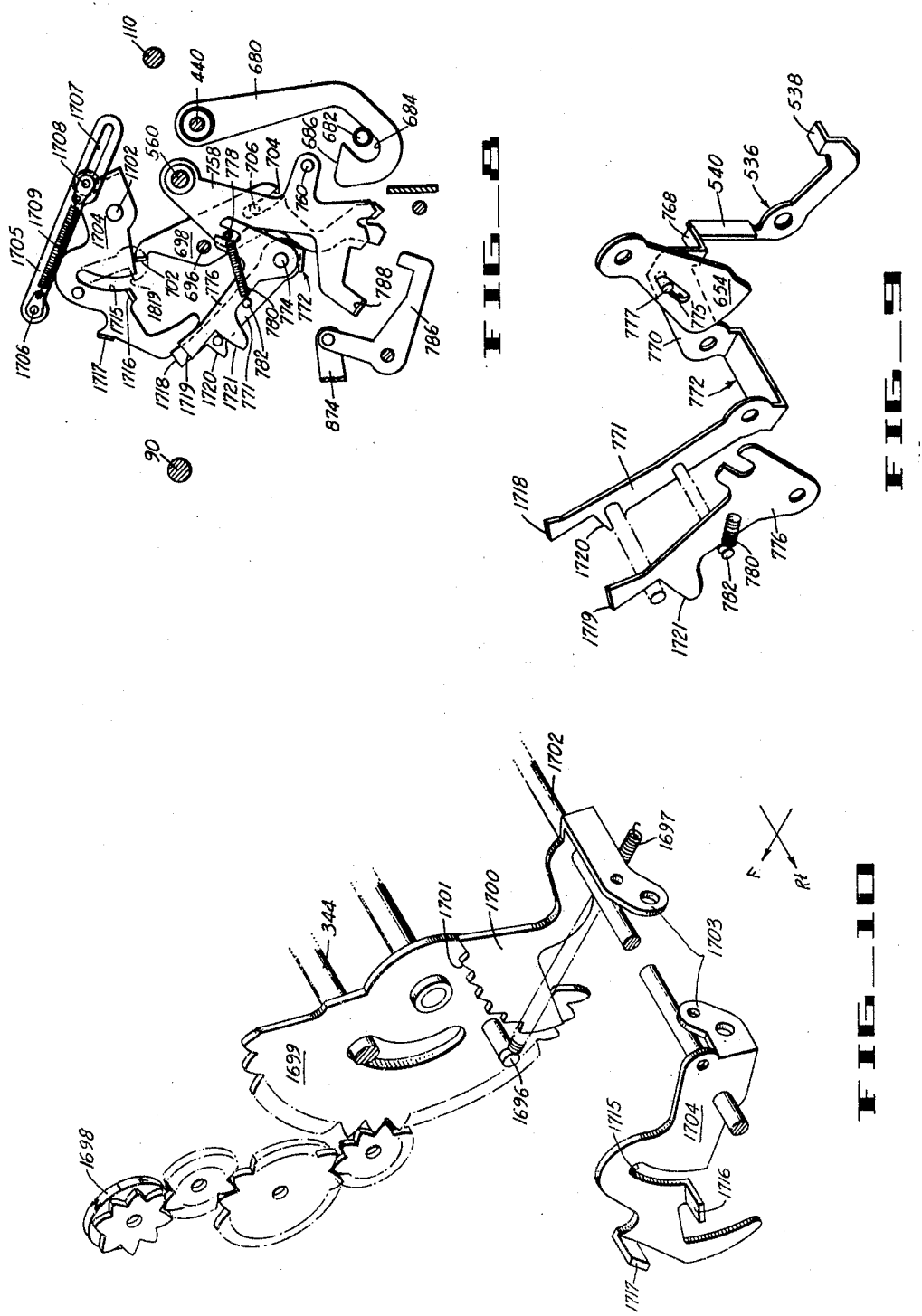

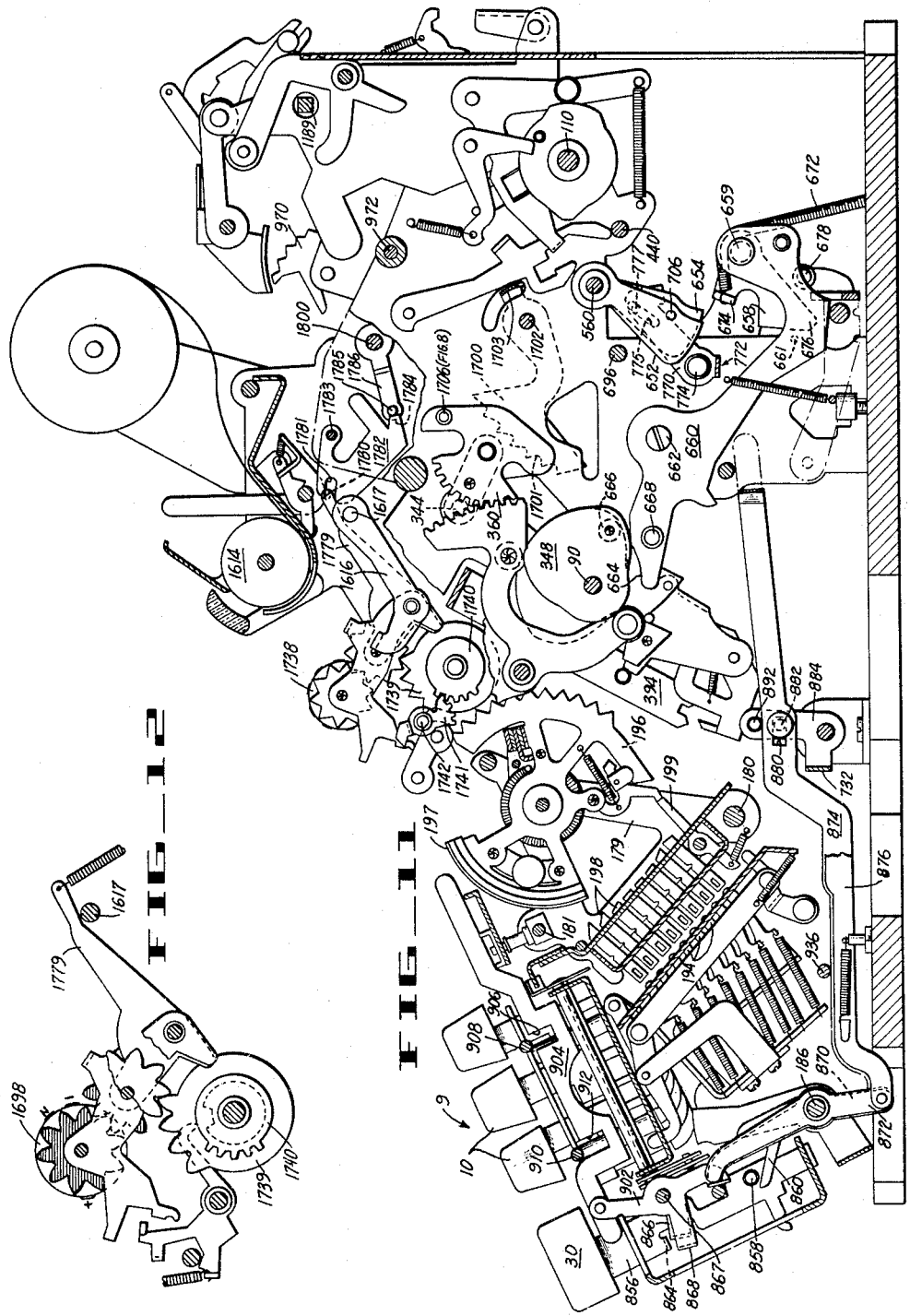

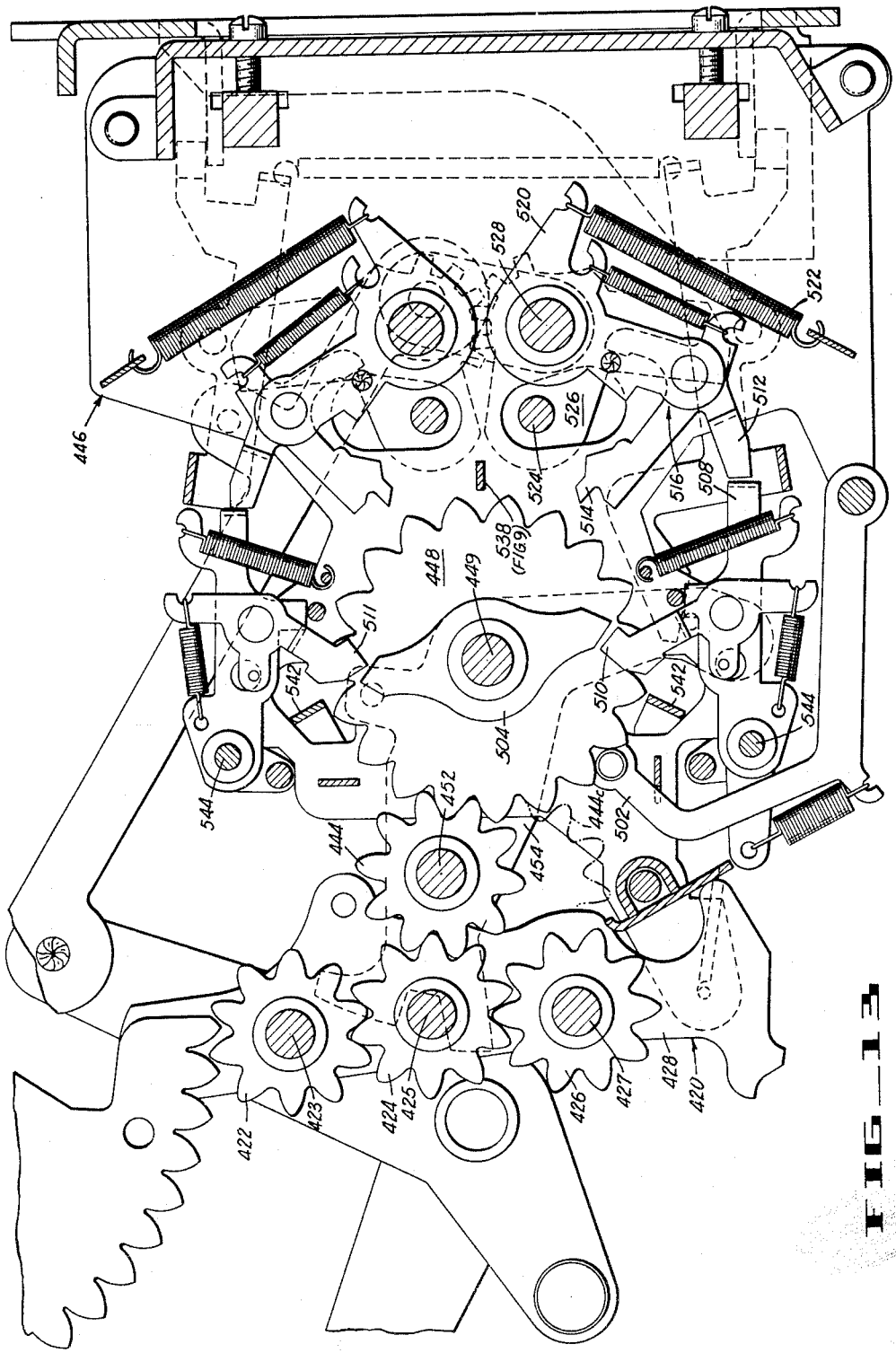

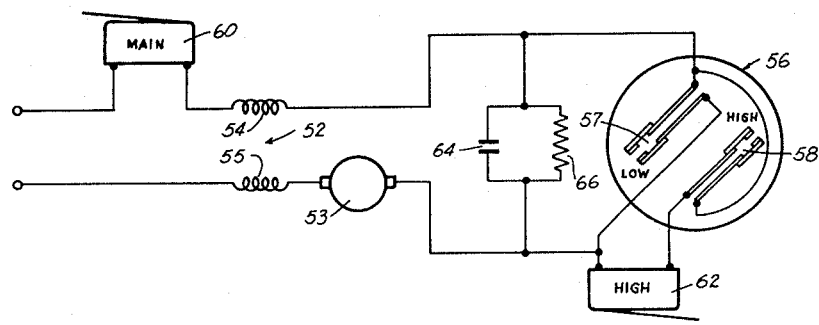
FIG_14
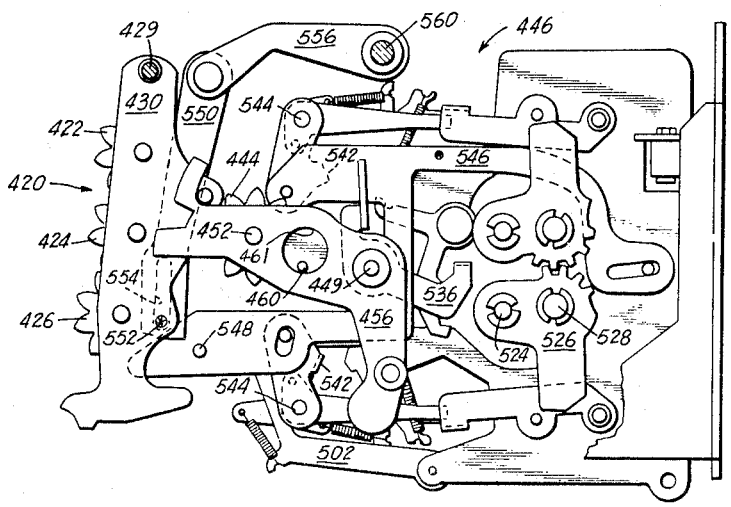
FIG_15

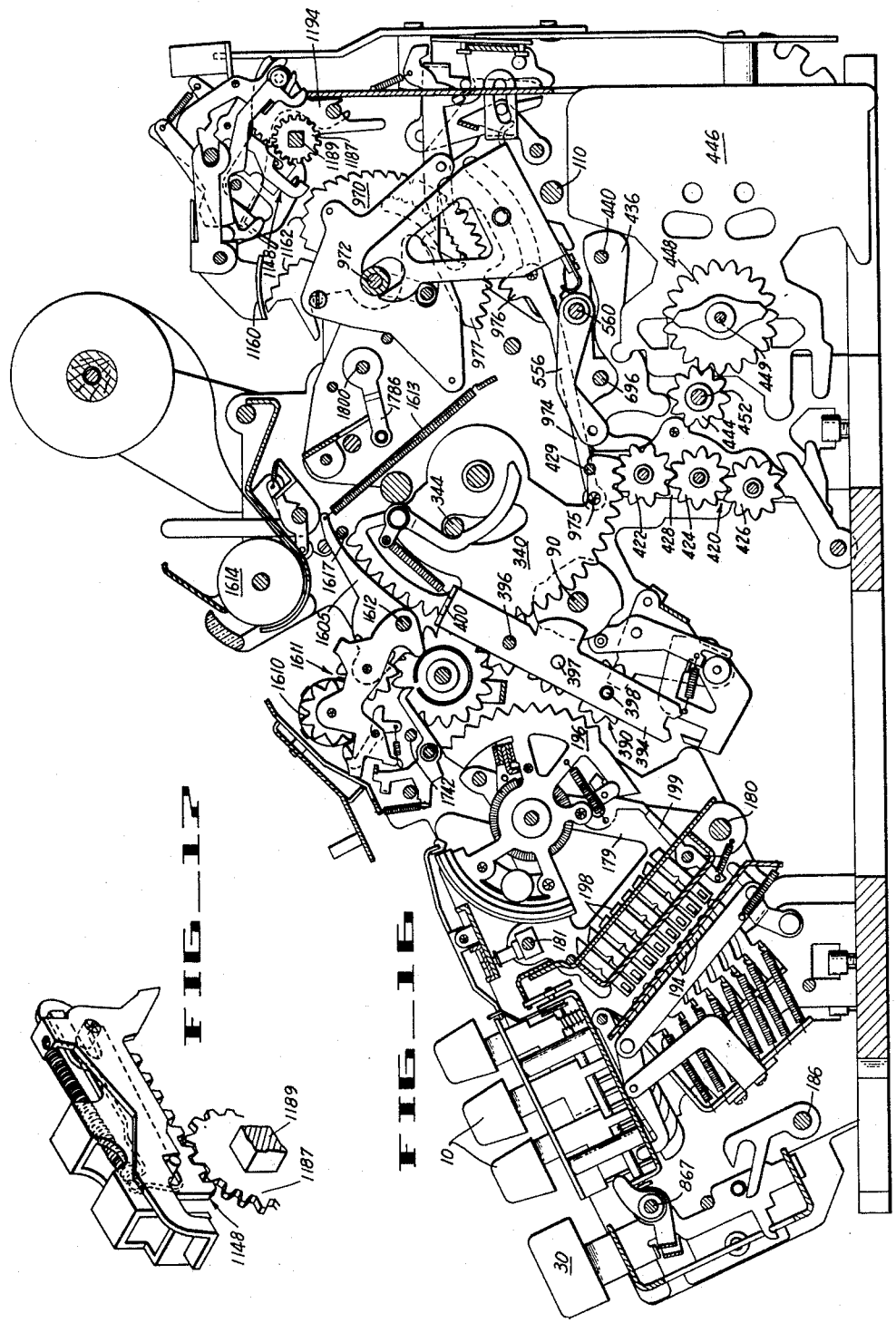

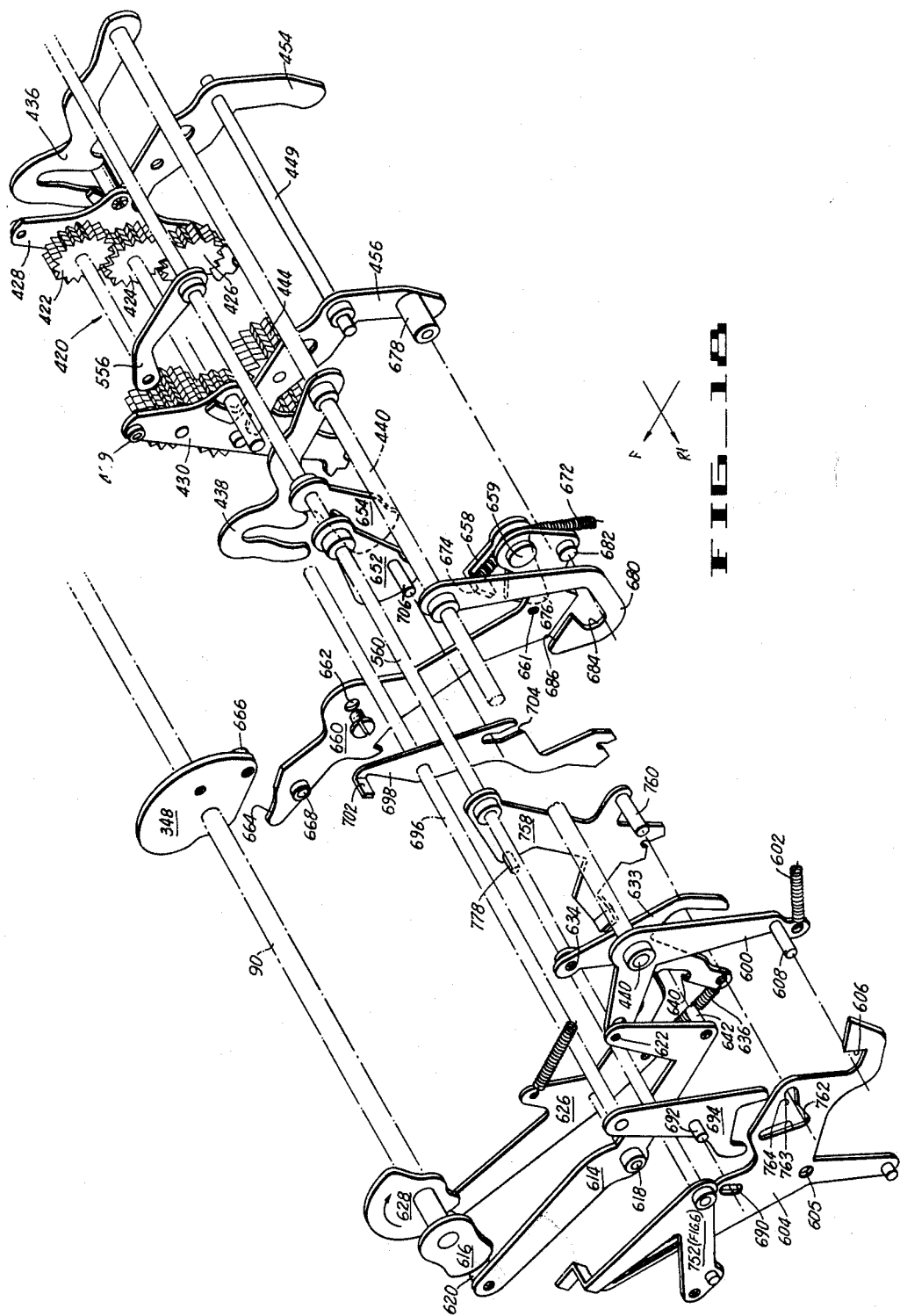

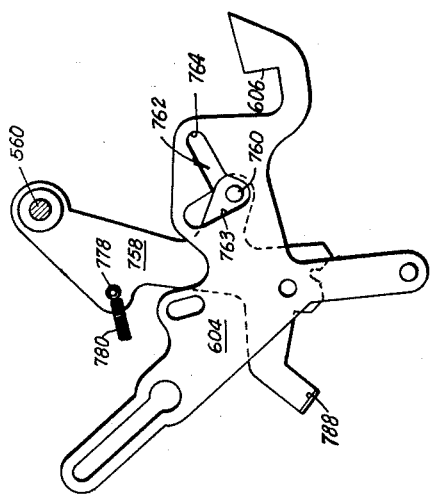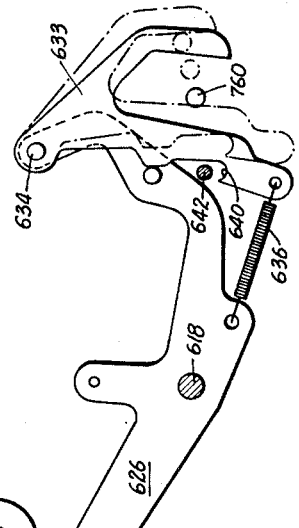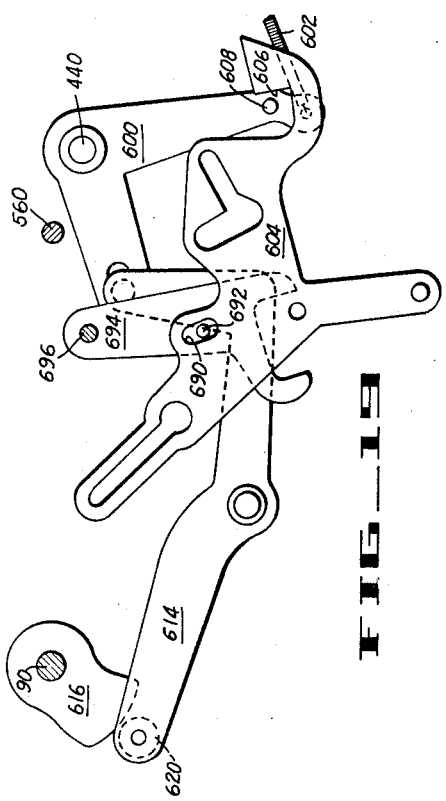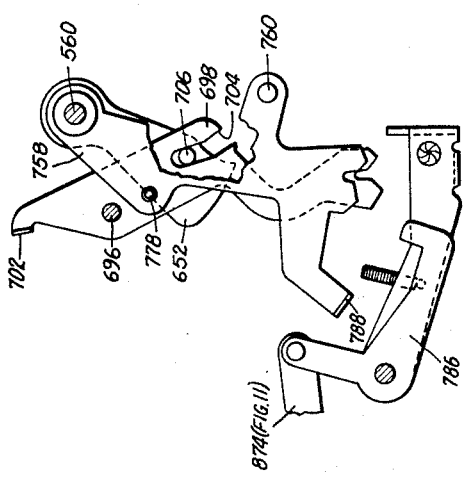

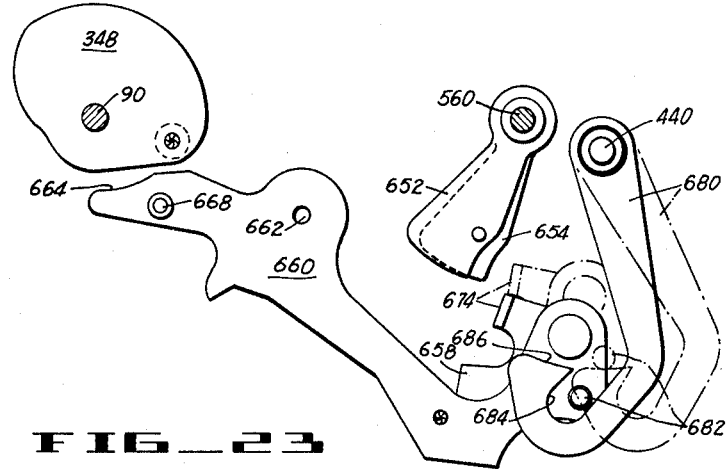
FIG_23
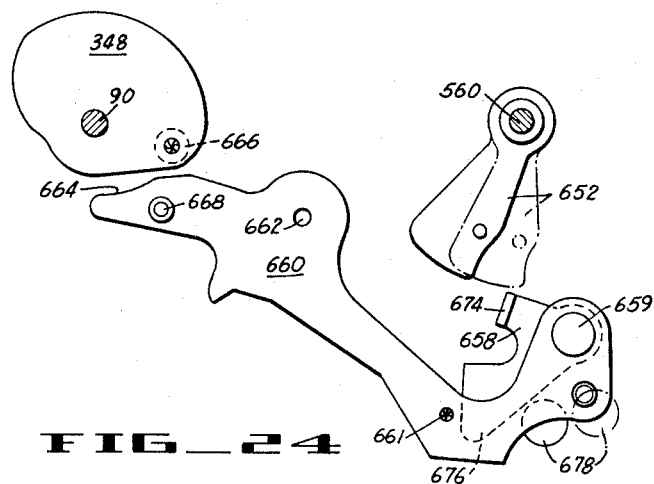
FIG_24
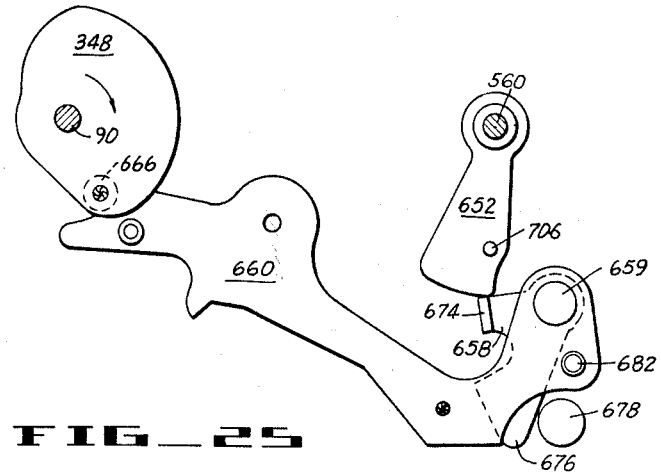
FIG_25

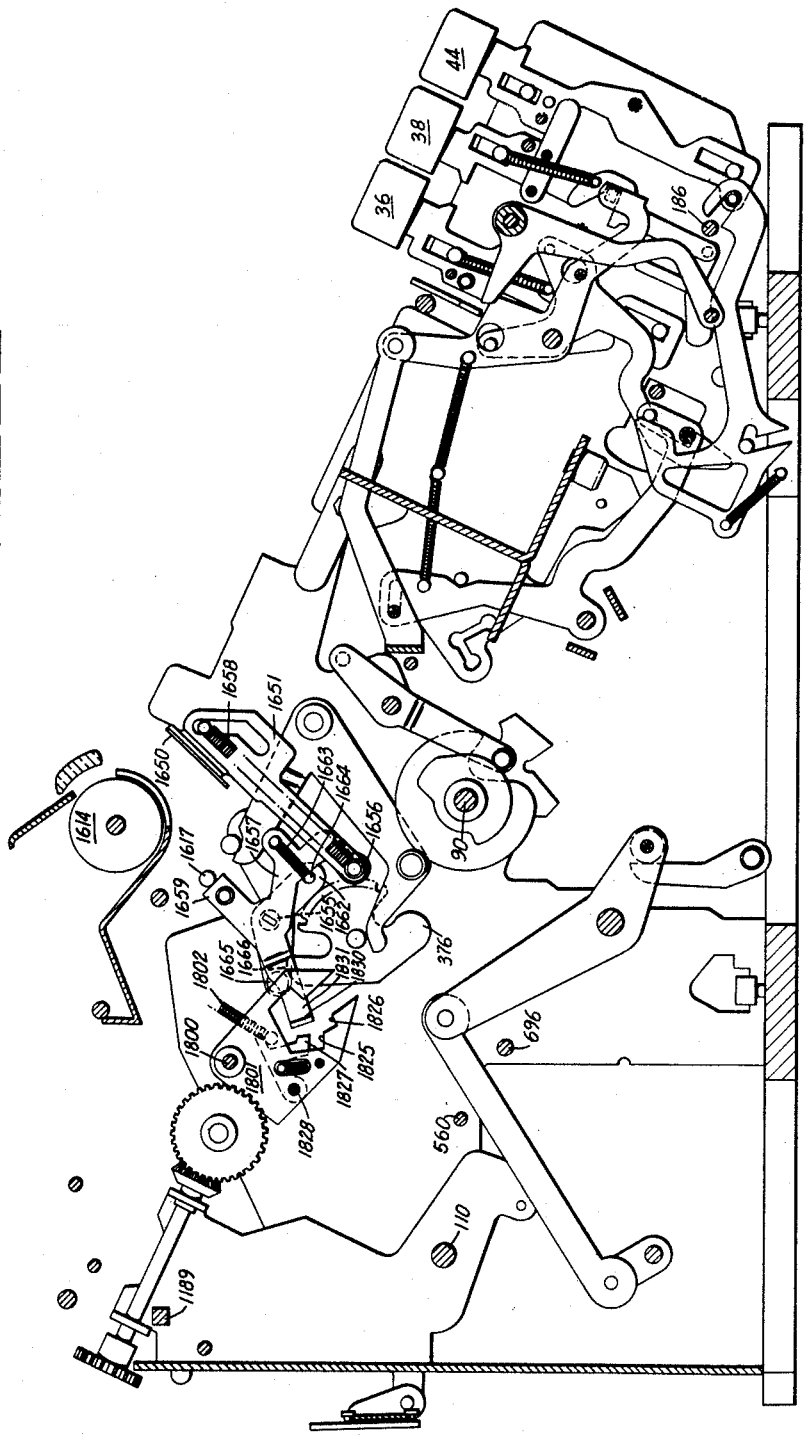
FIG_26

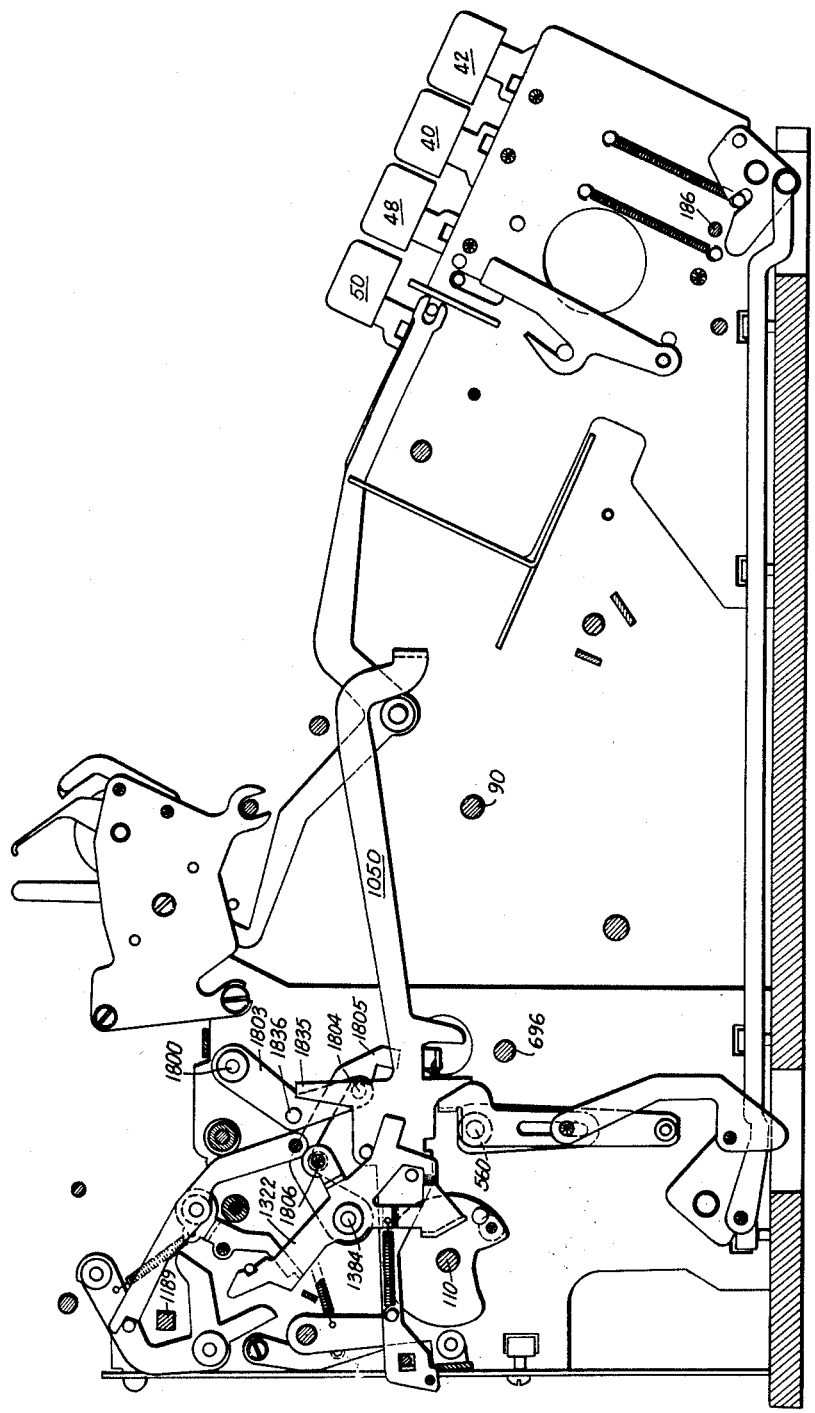

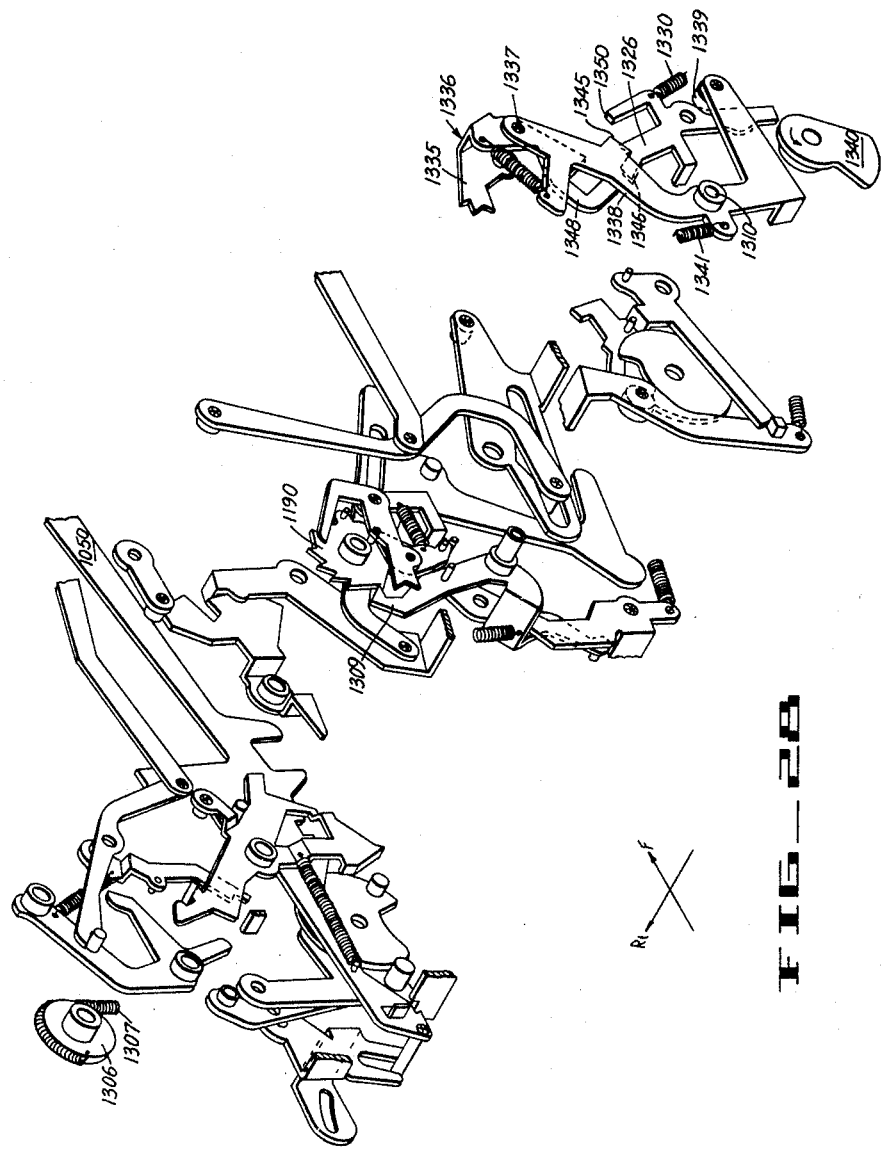

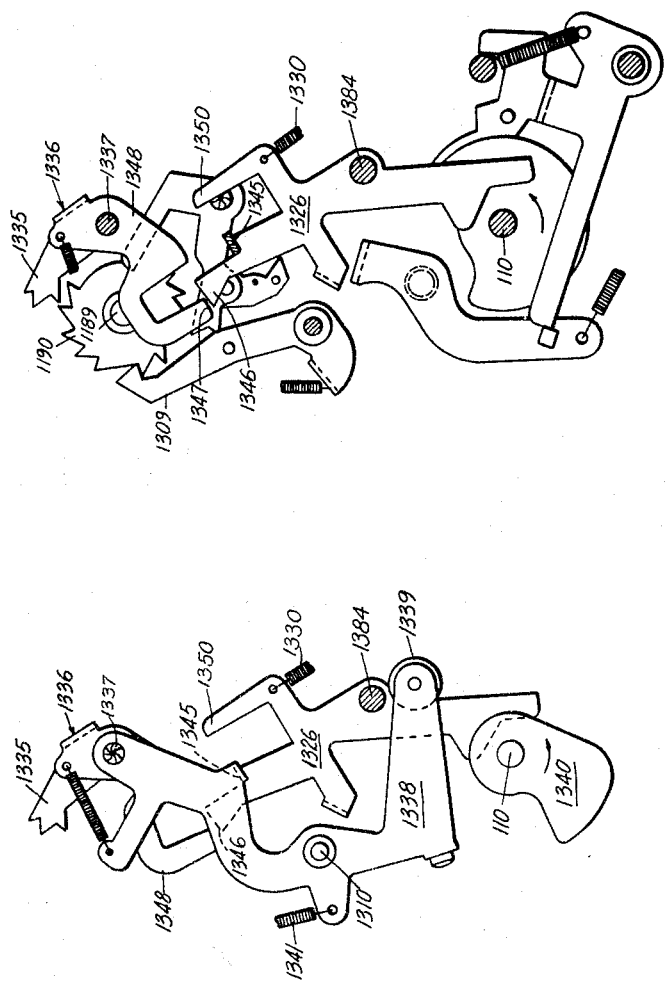

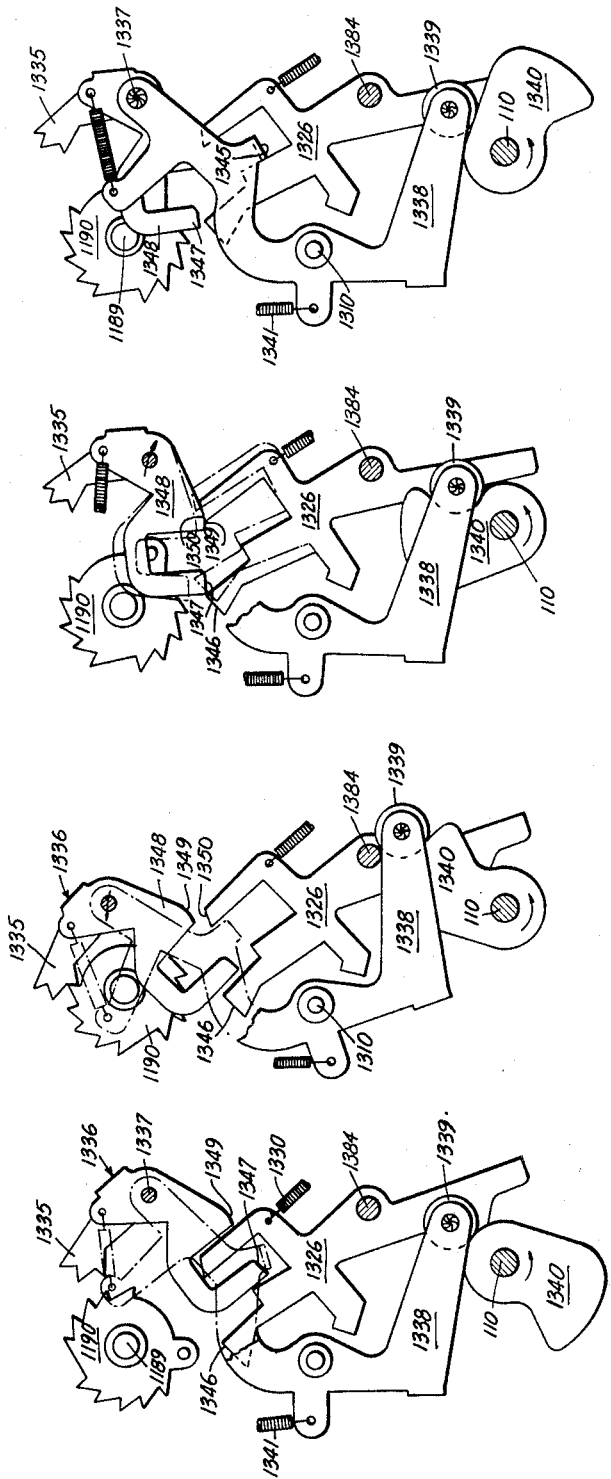

3,184,159
PROGRESSIVE LATCHES FOR CALCULATING MACHINES
Harold J. Chall, Castro Valley, and Cecil F. Clemons, San Leandro, Calif., assignors, by mesne assignments, to Friden, Inc., San Leandro, Calif., a corporation of Delaware
Filed Feb. 12, 1962, Ser. No. 172,630
4 Claims. (Cl. 235—60)

TABLE OF CONTENTS

| | Column |
|---|---|
| (I) General Operation | 3 |
| (II) Drive System | 4 |
| (III) Selection Unit | 5 |
| (IV) Actuator | 5 |
| (V) Front Gear Pendant | 5 |
| (VI) Rear Gear Pendant | 6 |
| (VII) Accumulator Drive Gears | 6 |
| (VIII) Accumulator | 6 |
| (1) Tens-Transfer | 6 |
| (2) Clear-Out Stops | 7 |
| (3) Credit Balance Indictor | 7 |
| (IX) Mechanism for Controlling Entries Into, and Readouts From, the Accumulator | 8 |
| (1) Swinging the Read Gear Pendant | 8 |
| (2) Shifting the Accumulator Drive Gears | 8 |
| (3) Interlocking the Drive Gears and Rear Pendant | 9 |
| (4) Accumulator Entries | 9 |
| (5) Total and Subtotal | 10 |
| (X) Right Side Control Keys | 11 |
| (1) Print-Only, Addition and Subtraction | 11 |
| (2) Total and Subtotal | 12 |
| (3) Repeat | 13 |
| (XI) Multiplier-Storage, or Memory, Unit | 13 |
| (XII) Multiplication Control | 14 |
| (XIII) Counter Ratchet Feed | 14 |
| (XIV) Printing | 15 |
| (XV) Symbols for Right Side Operations | 15 |
| (XVI) Operational Control of Symbols | 17 |
| (XVII) Symbols for Operations by the Left Side Control Keys | 17 |
| (XVIII) Control of Printing, Symbols and Speed by Left Side Operations | 17 |

The present invention relates to automatic printing calculating machines.

The present invention is embodied in the same machine that is disclosed more fully in the copending applications of Harold J. Chall, Serial No. 138,645, filed September 18, 1961, and of Harold J. Chall and Charles W. Wiedeman, Serial No. 117,096, filed June 14, 1961, now Patent No. 3,108,745, issued October 29, 1963, to which reference is made for supplementing the description herein. For convenience, identical parts are identified by the same reference numerals in this and in those copending applications. The calculating machine of the present invention constitutes an improvement on the well-known Friden ten-key adding machine, shown, for example, in Chall, Patent No. 2,832,530, and includes mechanism for automatically carrying out multiplication and for registering the results thereof in various manners.

It is an object of the present invention to provide a versatile and improved calculating machine capable of performing addition, subtraction, and automatic multiplication, and of printing a simple and concise record of those operations.

It is an object of the present invention to provide an improved calculating machine that requires a minimum number of interlocks among the operating keys, that responds to certain combinations of simultaneously depressed keys by performing preferred operations and rejecting others, that permits numerous combined operations and rejects certain others, and that automatically substitutes corrective operations for certain rejected operations.

It is a further object to provide a calculating machine that has a simple control for the symbols that identify specific operations, that has a simple control for printing the correct symbols for multiple key operations and for corrective operations, and that has a symbol control responsive to the machine operations themselves.

It is an object of the present invention to provide an improved operation counter, an improved control for the drive pawl of a ratchet, a latch for holding a ratchet drive pawl in an inoperative position, and a combined latch and pawl-lifter operated by the motion of the drive pawl itself.

It is an object of the invention to provide an improved speed control and printing control for plural cycle operations such as multiplication, an improved control for altering the operation after the first machine cycle, and an improved step-by-step control for a calculating machine.

A further object is the provision of an improved control for an automatic, multiplying machine for suppressing unwanted printing of certain details of the multiplication operation.

A further object is the provision of an improved automatic calculating machine operable at multiple speeds, and operable at high speed during the nonprinting part of a calculation.

And it is a further object of the present invention to provide an improved high speed printing calculator.

These and other objects and advantages of the present invention will be apparent from the following description of a specific embodiment thereof, and from the claims, taken in connection with the accompanying drawings in which:

FIG. 1 is an external, perspective view of a machine, complete with case, embodying the present invention, taken from the upper right front.

FIG. 2 is a skeleton plan view of the machine, showing the locations of certain of the frame members and shafts.

FIGS. 3 and 4 are exploded perspective views from the upper right front showing the cams on the main drive shaft and rear drive shaft, respectively.

FIG. 5 is a right elevational section taken along the the line 5—5 of FIG. 2, showing particularly part of the drive system and clutch control.

Figure 7:
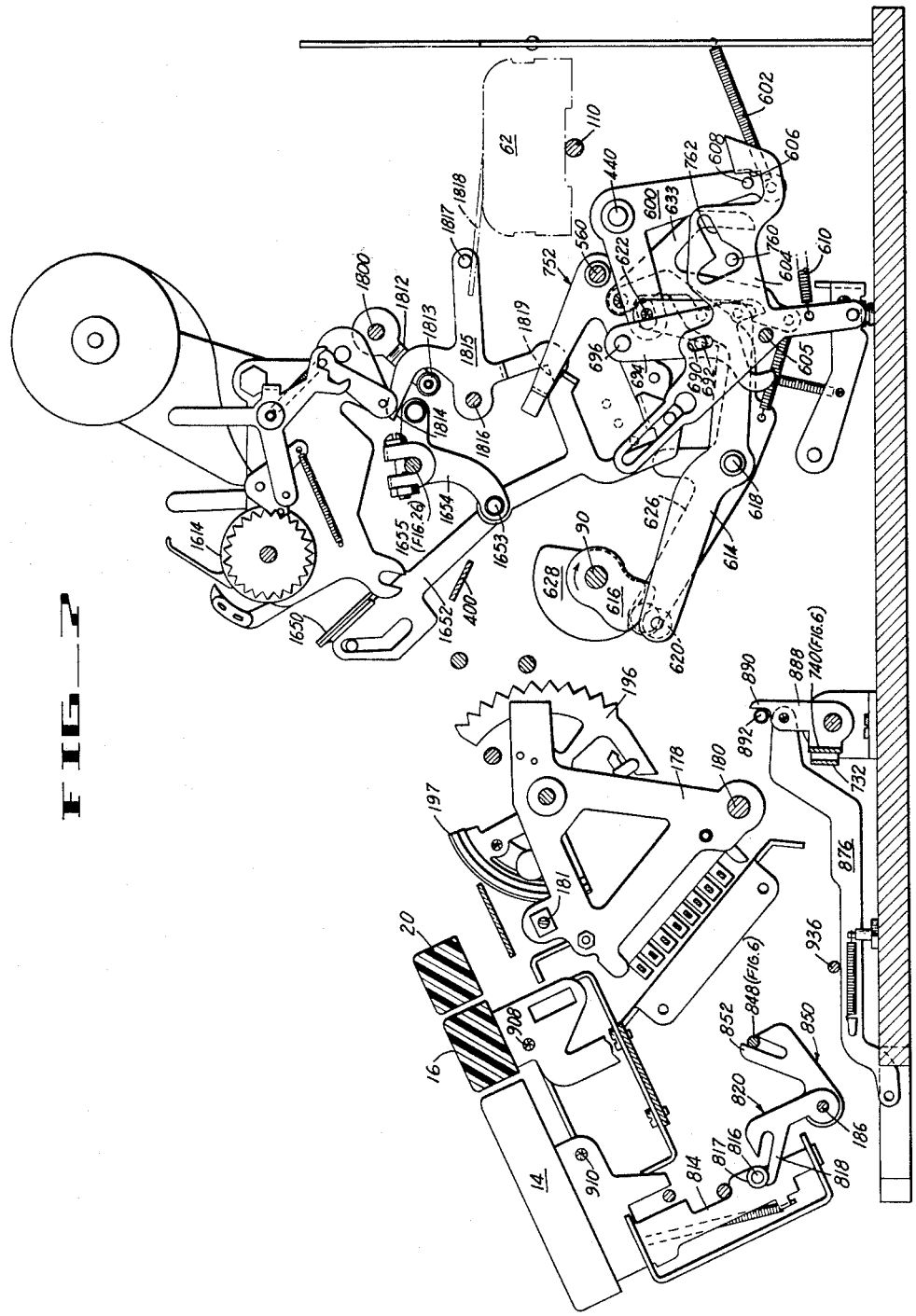

FIGS. 6 and 7 are right elevational sections taken along the lines 6—6 and 7—7, respectively, in FIG. 2, showing, for example, some of the mechanism for accumulator entries and total operations.

FIG. 8 is a right elevational partial section taken along the line 8—8 of FIG. 2, also showing mechanism for accumulator entries and totals.

FIGS. 9 and 10 are exploded perspectives taken from the upper right rear for explaining the operation of the mechanism appearing in FIGS. 8, 11 and 15, for testing the sign of the number in the accumulator.

FIG. 11 is a right elevational section taken along the line 11—11 in FIG. 2.

FIG. 12 is a right elevational partial section taken substantially along the line 12—12 of FIG. 2 showing the print wheel mechanism for the symbols for the right side controls.

FIG. 13 is an enlarged right elevational section for showing the accumulator and its gear pendant, the pendant being in operated position.

FIG. 14 is a diagram of the electric circuit for the motor.

FIG. 15 is a right elevational section taken substantially along the line 15—15 in FIG. 2 and showing the accumulator and its gear pendant.

FIG. 16 is a right elevational section taken along the line 16—16 in FIG. 2.

FIG. 17 is a perspective view from approximately the right front showing the digit sensor of the multiplier unit.

FIG. 18 is an exploded perspective view from the upper right rear sh wing certain parts of the mechanism that control the entries into and readouts from, the accumulator.

FIGS. 19 through 25 are enlarged right elevational details for explaining the operation of the mechanisms, shown, for example, in FIG. 18.

FIGS. 26 and 27 are left elevational sections taken along the lines 26—26 and 27—27 in FIG. 2, showing, for example, parts of the printing and speed control mechanism.

FIG. 28 is an exploded perspective from the upper left rear showing certain parts of the multiplication control, some of which parts appear also in FIGS. 26 and 27.

FIGS. 29 and 30 are enlarged left elevational sections of part of the mechanism shown in FIG. 28, showing particularly the mechanism for operating the multiplication counter ratchet, and, FIGS. 31 through 34 are enlarged left elevational views of the mechanism of FIGS. 29 and 30 for explaining its operation.

(I) GENERAL OPERATION

The calculating machine shown in the drawings is of the ten-key, actuator type, and in its general features is constructed in accordance with U.S. Patent No. 2,832,530, and is similar to the well-known Friden adding machine.

A number may be entered in a movable selector unit by means of selection keys 9 (FIG. 1), which include the nine numeral keys 10 and the 0 key 11, and the number so entered appears in a check window 12 on the check dials 197 of the selector segments 196 (FIG. 11). Depression of an addition key 14 or a subtraction key 16 then initiates an operation that transfers the number to the actuator sectors 340 (FIG. 16) and also to the accumulator 446, and prints it, the operation clearing the number from the selector unit. Depression of a repeat (R) key 20 causes a number in the selector to be entered additively in the accumulator without clearing it from the selector. Simultaneous depression of the repeat key 20 and subtract key 16 similarly enters the number subtractively into the accumulator without clearing it from the selector. A print-only (N) key 22 causes the number in the selector to be printed and cleared. A clear keyboard (CKB) key 24 causes the number in the selector to be cleared therefrom and the selector unit to be returned to its home position. A backspace key 26 causes the movable selector carriage to move one space to the right and clear out the digit last entered. A depression of a total (T) key 30 causes the number in the accumulator to be transferred to the actuator and to be printed, leaving the accumulator clear. Depression of a subtotal (S) key 32 similarly transfers the value from the accumulator to the actuator for printing, but in addition returns it to the accumulator.

With a number in the selector unit, and showing in the check window 12, depression of a multiplier-entry ($\times$) key 36 transfers the number from the selector to the actuator, and also to the sectors 970 (FIG. 16) of a multiplier-storage, or memory, unit and prints the number, leaving the selector clear. A multiplicand may then be entered in the selector by means of selection keys 9. Then, depression of a multiplication (=) key 38 causes the multiplicand to be printed once, the multiplication to be performed automatically, the product to be accumulated additively in the accumulator and the number in the accumulator to be printed out in a total operation. Alternatively the multiplication operation may be initiated by the depression of an accumulative multiplication (=S) key 42, which causes a similar multiplication operation but ends with a subtotal operation, thereby leaving the accumulated product in the accumulator. Depression of a negative multiplication (—=) key 40 causes an operation similar to that of multiplication key (=) 38, but enters the product negatively in the accumulator. A depression of a product transfer (T to $\times$) key 44 produces the same operation as the multiplication key 38, with the addition that the final value in the accumulator is transferred to the multiplier-storage, or memory, unit. Any combination of the keys 38, 40, 42 and 44 may be depressed simultaneously.

With a number in the selector, a squaring entry ($\times^2$) key 46 may be depressed to cause the number in the selector to be entered in the multiplier-storage unit and also retained in the selector. Then, any of the keys 38, 40, 42 or 44 may be depressed to cause an automatic multiplication for producing the square of the number.

A memory input (MI) key 48 and a memory output (MO) key 50 are preparatory keys and do not, by themselves, cause an operation of the machine. The memory input key 48 may be depressed previously to, or simultaneously with, keys 14, 16, 20, 22, 30, or 32 to cause the number that is printed to also be entered in the multiplier-storage, or memory, unit. The memory output key 50 may similarly be used with the print-only key 22 for printing out the number standing in the multiplier-storage unit. The memory output key 50 may also be used with either the addition key 14 or subtraction key 16 for printing the number in the multiplier-storage unit and entering it additively or subtractively, respectively, into the accumulator. No memory output operation leaves the multiplier-storage unit clear. The number is transferred from the multiplier-storage, or memory, unit to the actuator for printing, and then is returned to the multiplier-storage unit. Clearing of the storage unit is performed only in preparation for the entry of a new number.

(II) DRIVE SYSTEM

As described in greater detail in the copending applications previously referred to, and as shown in FIG. 16, the machine includes a main drive shaft 90 and a rear drive shaft 110 which are geared to rotate in synchronism and at the same speed. A drive mechanism of a well-known construction, including an electric motor 52 (FIG. 5) and a dog clutch 84, 94 (FIG. 3) is provided for driving the shafts (clockwise in these figures) in integral cycles. FIG. 3 shows the drive gear, dog clutch and control cams on the main drive shaft 90. FIG. 4 shows the control cams on the rear drive shaft 110. The machine operates automatically through one cycle for each of the operations of the addition, subtraction, print-only, total, subtotal, clear keyboard, backspace, multiplier-entry and squared entry. Multiplication and repeat operations involve two or more integral cycles.

As shown in FIG. 14 motor 52 includes an armature 53 and field coils 54 and 55, and is provided with a governor 56 having two pairs of centrifugally operated contacts 57 and 58 adjusted to open at two different speeds of the motor. A main switch 60 (FIG. 5) supplies current through low speed contacts 57 (FIG. 14) to the motor 52 for operation at low speed. The series combination of a high speed switch 62 (see also FIG. 5) and the high speed governor contacts 58 is connected across the low speed contacts 57 so that when both switches 60 and 62 are closed, the motor operates at high speed. The action of the governor is simply to open the contacts and interrupt power to the motor when the speed exceeds the value for which the contacts are set. Since contacts 58 open at a higher speed than do contacts 57, they will maintain the circuit up to higher speed even though the low speed contacts 57 open. A capacitor 64 and a resistor 66 constitute a filter for suppressing electric arcs and noise at the contacts 57 and 58. Automatic multiplication is begun and ended at low speed and is otherwise operated at high speed. All other key-initiated operations are performed at low speed.

(III) SELECTION UNIT

The selection unit is similar to the constructions shown in U.S. Patents, Nos. 2,371,752, 2,832,530, and 2,832,532. A stationary portion includes the digit keys 9 (FIG. 1) and setting levers 194 (FIGS. 11 and 16), the location of which constitutes a selection station. A selection carriage, including right and left frame members 178 and 179 (FIGS. 7 and 11), slides transversely on rods 180 and 181, and is spring-biased toward the left. The carriage also includes the selection sector 196 in each of sixteen numerical orders, a column of stop pins 198, and a zero latch 199 for each sector. As is explained in the prior patents referred to, initially, the leftmost order of the selector is aligned with the setting levers 194 at the selection station. Depression of one of the digit keys 10 differentially sets the selector segment 196 of that order in accordance with the number, and operates an escapement for indexing the carriage one order to the left to bring that order into alignment with the rightmost order of the actuator, and to bring the next order of the selector carriage in line with the setting levers 194. Each selector sector 196 carries the check dial 197 bearing numerals which are exposed through the check window 12 (FIG. 1) for showing the number set in the selector unit. Thus, the selector carriage is indexed to the left order-by-order as the digits of the number are entered one at a time, most significant digit first. The carriage is also indexed to the left during multiplication.

(IV) ACTUATOR

An actuator of well-known construction includes seventeen ordinally arranged sectors 340 (FIG. 16) which are yieldingly driven (counter-clockwise in this figure) during the first half of each machine cycle and are driven (clockwise in this figure) during the second half of the cycle to their home position, in which they are shown.

(V) FRONT GEAR PENDANT

The actuator is arranged to be connected to the selector unit by means of a front gear pendant 390 (FIG. 16) of well-known construction. It includes a pair of frame members (of which the right frame 394 appears in FIG. 16) supported on a transverse shaft 396. This shaft 396 and shafts 397 and 398 carry three gears for each order, the uppermost gear being permanently in mesh with the actuator sector 340 and the lowest gear being arranged for movement into and out of mesh with the selector sector 196. Frame member 394 carries, at its upper end, an ear 400 which is normally embraced by a notch 708 of a link 710 (FIG. 6) for moving the pendant.

Link 710 extends forward from an up-extending arm 712 of a bellcrank 714 journalled at 716. A second arm carries a roller 718 riding a front pendant control cam 720 on the main drive shaft 90. Bellcrank 714 is spring-biased (counter-clockwise as seen in FIG. 6) for holding the roller 718 against the cam. Cam 720 moves the link 710 rearward early in each machine cycle, holds it there until mid-cycle, and then moves it forward again. With the link 710 engaging the ear 400 of the front gear pendant 390, this action swings the pendant into engagement with the selector sectors 196 (FIG. 16) during the first half of the cycle so that the number set into the selector is transferred to the actuator, as is required in addition, subtraction, and certain other operations, and disengages the pendant from the selector at mid-cycle. The forward end of the link 710 is slotted, and guided on a pin 722 (FIG. 6) on a bellcrank 724, which is journalled at 726. For totaling, memory-output, clear keyboard, and backspace operations, the bellcrank 724 is rocked clockwise in FIG. 6 for lifting the link 710 and notch 708 clear of the ear 400, as will be explained.

(VI) REAR GEAR PENDANT

A rear pendant, indicated generally by the reference numeral 420 (FIG. 16), includes an upper gear 422, a middle gear 424 and a lower gear 426 for each numerical order of the actuator. Left and right frame members 428 and 430 (see also FIG. 18) are journalled on pins 429 and, in turn, carry shafts 423, 425 and 427 (FIG. 13) on which the several gears 422, 424 and 426, respectively, turn free. The upper gears 422 (FIG. 16) are in constant mesh with their respective actuator sectors 340, and similarly the gears 422, 424 and 426 in each order are constantly in mesh. Left and right box cams 436 and 438 on a transverse shaft 440 (FIGS. 16 and 18) are arranged to swing the pendant 420 rearward and forward to carry gears 424, or alternatively, the gears 426, as will be explained, into and out of engagement with drive gears 444 of the accumulator, indicated generally by the reference numeral 446.

(VII) ACCUMULATOR DRIVE GEARS

Each of the drive gears 444 is in constant mesh with a register gear 448 of the accumulator and is arranged to occupy its normal, upper, or home position, shown in FIG. 16, and a lower, alternative position 444–c, shown in FIG. 13, for engagement with the gears 424 and 426, respectively. The drive gears 444 turn free on a shaft 452 carried by a pair of brackets 454 and 456 (FIGS. 15 and 18) journalled on a shaft 449 of the register gears 448, and are biased to their upper, normal position by a spring (not shown). The upper and lower limits of the motion of the brackets 454 and 456 are determined by a pin 460 which extends through a hole 461 in the brackets.

In the operation of addition, a number is transferred from the selector to the actuator and simultaneously from the actuator to the accumulator 446 during the first half of the machine cycle. In this operation the drive gears 444 remain in their upper or normal position and the pendant 420 is moved rearward for engaging the gears 424 with the drive gears 444. The register gears 448 accordingly rotate (counter-clockwise as seen in FIG. 13) for the positive entries. The subtraction is performed similarly, except that the drive gears 444 are moved to their lower position 444–c and are engaged by the lowest pendant gears 426 for driving the register gears 448 clockwise in FIG. 13. When a total or subtotal is read out of the accumulator 446, the drive gears 444 are controlled by a credit balance indicator 536 (FIGS. 9 and 15), as will be described. For a negative value in the accumulator, the drive gears 444 remain in their upper, or normal, position for engagement with the pendant gears 424. For a positive value in the accumulator, the drive gears 444 move to their lower position for engagement with the lowest pendant gears 426. For a total operation, the number is read out of the accumulator during the first half-cycle of operation and is printed, leaving the accumulator clear. For a subtotal operation, the number is read out of the accumulator in the first half-cycle, printed, and then returned to the accumulator during the second half-cycle.

(VIII) ACCUMULATOR

The accumulator 446 is best shown in FIGS. 13 and 15 and includes mechanism shown and described in the U.S. Patent No. 2,832,530 already referred to. Thus, the accumulator (FIG. 13) includes, for each numerical order, the twenty-tooth register gear 448 which is provided with a spring-pressed detent 502 for centering it in each digital position.

(1) *Tens-transfer*

Fixed to each gear 448 is a two-pointed cam 504 which initiates a tens-transfer. The tens-transfer mechanism operable for positive entries (counter-clockwise in FIG. 13) includes a spring-urged lever, or gate, 508 carrying a spring-pressed live tip 510 arranged to be rocked by the cam 504 when the number in the gear changes from "9" to "0." When rocked, the gate 508 releases a tip 512 of a three-armed spring-urged lever 516, which is carried on a spring-driven lever 520. When the tip 512 is released, a spring 522 urges the lever 520 (clockwise as seen in FIG. 13). A pawl 514 at the tip of lever 516 is arranged to drive against the teeth of the register gear 448 of the next higher order for driving it an additional tooth-space in the positive direction (counter-clockwise in FIG. 13) for effecting the tens-transfer. However, the transfer lever 520 is restrained by a bail rod 524 during the entry of the number from the actuator, and is permitted to operate only after the pendant gear has been disengaged from the drive gear 444 of the accumulator. The bail rod 524 is carried by a pair of similar brackets 526 (FIG. 15) on a shaft 528, and is controlled by a tens-transfer cam 492 (FIG. 3) in a well-known manner, as described in the copending applications previously referred to.

A "fugitive-one" transfer, that is, a tens-transfer from the highest to the lowest order is provided for permitting the readout of true negative values, or true "credit balances," as is well known. Similar tens-transfer and "fugitive-one" transfer mechanism is provided for negative entries, which mechanism includes a live tip 511 (FIG. 13), for each order, arranged to be actuated by the same tens-transfer cam 504 that initiates the positive tens-transfer.

(2) Clear-out stops

The present accumulator includes so-called "zero blocks," or clear-out stops, of a well-known type consisting of bails 542 journalled on shafts 544 for blocking the live tips 510 and 511. For example, when the register gear 448 and tens-transfer cam 504 rotate (clockwise in FIG. 13) for the readout of a positive number, they will be stopped when the tens-transfer cam 504 abuts tip 510, which is, in turn, blocked by the bail 542, then in a position (clockwise or to the right of the position shown in FIG. 13) for blocking the tip 510. As shown in FIG. 15, the two bails 542 are connected to a slide 546 which include a pin or abutment, 548 at its extreme left, as seen in FIG. 15. The slide 546 is spring-urged to the left in this figure for normally holding the rocking bails 542 (FIG. 13) clear of the tips 510 and 511 so that normally the blocks are in position to permit entry of numbers into the accumulator. The right-hand frame 430 of the gear pendant 420 (FIG. 15) carries an interponent 550, which is connected thereto by a pin 552 on the pendant frame for guiding a slot 554 in the interponent.

The upper end of interponent 550 is pinned to an arm 556 fixed to a total-subtotal shaft 560. Whenever a total or subtotal is to be taken, the shaft 560 is rotated counter-clockwise as seen in FIG. 15. The rotation is greater for the subtotal, but either motion is sufficient to place the lower end of interponent 550 opposite the abutment 548 of the zero block 546, so that the rearward motion (to the right in FIG. 15) of the gear pendant 420 moves the slide 546 rearward for setting the blocking bails 542 (FIG. 13) behind the tips 510 and 511.

(3) Credit balance indicator

The accumulator includes an indicator of a well-known type, responsive to the "fugitive-one" transfer, for indicating the sign of the number in the accumulator. The bellcrank 536 (FIGS. 9 and 15) turns free on the main register shaft 449 and has a tongue 538 (see also FIG. 13) that lies in alignment with the pawl ends of the lever arm 516 and the corresponding arm of the negative tens-transfer lever in the lowest (right-hand) order. Tongue 538 will be rocked in opposite directions by these transfer pawls when the register goes through "0" in the positive and negative directions. Bellcrank 536 will lie in a clockwise or counter-clockwise position to indicate that the last "fugitive-one" transfer was negative or positive, respectively. The indicator 536 includes also an upward-extending lever 540 which will be sensed by the mechanism shown in FIG. 9 during the readout of the totals and subtotals.

(IX) MECHANISM FOR CONTROLLING ENTRIES INTO, AND READOUTS FROM, THE ACCUMULATOR

The principal mechanism for controlling the transfer of numbers into and out of the accumulator is located to the right of the accumulator and appears, for example, in FIGS. 6, 7, 8, 11 and 18. The function of this mechanism is to move the rear pendant 420 into and out of engagement with the drive gears 444 of the accumulator (FIG. 16), to move the drive gears 444 to their lower position when required for negative entries and positive readouts, and to test the sign of the number in the accumulator, all in response to the actuation of other controls which simply call for addition, subtraction, total or subtotal, and also to control the printing of symbols, as will be described.

(1) Swinging the rear gear pendant

The swinging of the rear gear pendant 420 is effected by a pair of box cams 436 and 438 (FIGS. 16 and 18), which are rocked down (counter-cockwise in these views) for moving the pendant rearward for engaging the drive gears 444 of the accumulator. As best shown in FIG. 18, the box cams 436, 438 are fixed to the shaft 440 controlled by a bellcrank 600 (see also FIG. 7). A spring 602 connected to bellcrank 600 continuously urges the shaft 440 (counter-clockwise in FIG. 18) for the urging the gear pendant 420 to engaged position.

Bellcrank 600 is connected at 622 to a lever 614, journalled at 618 and carrying a roller 620 arranged to ride a cam 616 on the main drive shaft 90. With the shaft 90 at its home position, cam 616 holds the box cams 436 and 438 in their upper position for holding the gear pendant 420 disengaged from the accumulator. During subtotal operations, the cam 616 permits the bellcrank 600, shaft 440 and box cams 436 and 438 to be rocked (counter-clockwise in FIG. 18) by the spring 602, and permits the rear gear pendant to remain in engagement with the accumulator during both the first and second halves of the machine cycle.

A lever 626 (FIGS. 7, 18 and 21), also journalled at 618 alongside lever 614, is pinned at 634 to a hook member 633. This hook member carries a hook portion 640 which is biased by a spring 636 into engagement with a pin 642 on the lever 614. During subtotal operations, the hook member 633 is rocked by a pin 760 extending from lever 758 (FIGS. 18 and 21) for disengaging hook portion 640 from pin 642 so that the rear gear pendant is controlled by lever 614 alone, as has been described. During addition, subtraction, and total operations, the hook portion 640 remains in its normal position in engagement with the pin 642 so that the action of spring 602 for engaging the rear pendant is restrained by both the levers 614 and 626. Lever 626 is controlled by a cam 628 on the main drive shaft 90, and the action of the two cams 616 and 628 together is to permit engagement of the rear gear pendant during only the first half of the machine cycle. Normally, a pin 608 on the bellcrank 600 (FIGS. 7, 18 and 19) is blocked, for holding the rear gear pendant 420 disengaged from the accumulator, by a hook plate 604 journalled at 605.

(2) Shifting the accumulator drive gears

The shifting of the drive gears 444 is controlled by two similar blocking members 652 and 654 journalled on the total-subtotal shaft 560 (FIGS. 11 and 18). These blocking members are normally held in the position shown in FIG. 11, but when a shift of the drive gears 444 is required, one or the other of these blocking members moves rearward (FIG. 23). Their position is then tested by a dog 658 that is journalled on a pin 659 on a lever 660. This lever is journalled on a stud 662 and its forward end (left in FIG. 23) has a cam surface 664 arranged to be engaged at the start of each machine cycle by a roller 666 between the two actuator cams 348 and 349. Lever 660 also carries a roller 668 that is held depressed by the periphery of cam 348 until about mid-cycle. Lever 660 is biased to its lower position, and the dog 658 is biased against a pin 661 (clockwise as seen in these figures) by a spring 672 (FIG. 11) that is fastened to an ear 674 on the dog 658 and extends over the pin 659 and down to the frame of the machine. A tail portion 676 of the dog 658 lies forward of a roller 678 (FIGS. 11 and 23) on the lower end of the right-hand arm 456 (FIG. 18) of the drive gear assembly.

Promptly at the beginning of each machine cycle, the roller 666 on the cams 348 and 349 depresses the cam surfaces 664 on the lever 660 for lifting the dog 658 to test the positions of the blocks 652 and 654. If these blocks are in their normal, forward, positions, as in FIG. 23, so that no shifting of the drive gears 444 is required, the ear 674 on the dog 658 will simply rise to the rear of the two blocking members 652 and 654. But if either blocking member has been moved rearward, as in FIG. 24, it will overlie the ear 674. Under this condition, when the lever 660 is rocked to lift the dog 658, the ear 674 is blocked and the dog 658 must turn (counter-clockwise in these figures). This action swings the tail 676 rearward (FIG. 25) against the roller 678 for swinging the arm 456 (FIG. 18) counter-clockwise for lowering the drive gears 444. This shifting takes place promptly at the start of the machine cycle and is completed before cam 616 (FIG. 18) permits the pendant 420 to be engaged.

(3) *Interlocking the drive gears and rear pendant*

An interlock action between the motions of the drive gear assembly and the gear pendant 420 is provided by a curved arm 680 (FIGS. 8 and 18) fixed to box cam shaft 440 and cooperating with a pin 682 on the lever 660. In FIG. 8, these parts are shown in their normal position with pin 682 lying in a slot 684 provided by the hook-shaped lower end of the arm 680. The initial action is the lifting of the rear end of the lever 660 (FIG. 23), and since the lever turns about its support 662, the pin 682 swings substantially free in the slot 684. In the highest position of pin 682, it is clear of the end surface 686 of the crook portion of arm 680, so that shaft 440 and arm 680 can turn (counter-clockwise in these figures) for lowering the box cams 436 and 438 and bringing the gear pendant 420 into engagement with the drive gears 444. This movement of arm 680 brings the end surface 686 under the pin 682, so that the arm 680 prevents return movement of arm 660 as long as the box cams 436 and 438 hold the gear pendant 420 in engagement with the drive gears 444. This interlock action between arm 680 and pin 682, among other things, holds lever 660 in its upper position until shaft 440 lifts the box cams 436 and 438 for disengaging the gear pendant 420. During a subtotal operation this interlock keeps the rear gear pendant 420 in engagement with the drive gears 444 until near the end of the machine cycle, even though cam 348 releases lever 660 near mid-cycle.

(4) *Accumulator entries*

The plate 604 is biased counter-clockwise, as seen in FIGS. 7 and 18, by a spring 610 to the limit permitted by the add-subtract control link 612 (FIG. 6) for blocking the pin 608 (FIG. 18). A slot 690 in the hook plate 604 embraces a pin 692 carried by a lever 694 fixed to an add-subtract shaft 696 to which is also fixed a lever 698. At the top of this lever is an ear 702 which is part of the symbol control mechanism (FIG. 8), as will be described. Below the shaft 696, the lever 698 has a slot 704 which embraces a pin 706 on the blocking member 652 (FIG. 22). For an additive entry, the plate 604 and lever 694 are rocked a few degrees (plate 604 counter-clockwise, and lever 694 clockwise in FIG. 18). This action lowers hook 606 for unblocking pin 608 (FIGS. 7 and 18). It also moves the block 652 rearward slightly (right in FIGS. 18, 22 and 23), but not enough for intercepting ear 674 of dog 658. Consequently, for this additive operation, the drive gears 444 will be left in their upper, normal position, and since nothing has disengaged the hook 633 from the pin 642 (FIGS. 18 and 21), the machine will perform an addition operation as previously described.

For a subtractive operation the plate 604 (FIGS. 7, 18 and 19) and lever 694 rock through substantially twice the angle as for an additive operation. This action produces a greater rearward movement of block 652 (FIG. 24) for bringing it into blocking position for intercepting the dog 658 and causing the drive gears 444 to be shifted to their lower position for the negative entry.

The add-subtract control shaft 696 (FIGS. 8 and 18) extends through to the left side of the machine for actuation by the multiplication control, as is more fully described in the copending applications previously referred to.

(5) *Total and subtotal*

The main total-subtotal shaft 560 (FIGS. 8 and 18) also extends to the left side of the machine (FIG. 27) for actuation by the multiplication controls. At the right end, the shaft 560 carries a bellcrank 752 (FIGS. 6 and 18) through which it is actuated by the total (T) and subtotal (S) keys 30 and 32 (FIG. 1), as will be described. The shaft 560 is rotated (counter-clockwise in FIGS. 6 and 18) a few degrees for causing a total operation of the machine, and is rotated in the same direction through substantially twice that angle for causing a subtotal operation. Shaft 560 carries the control lever 758 (FIGS. 8, 18 and 20) which carries the pin 760. As previously described, in a subtotal operation, the pin 760 rocks the hook lever 633. The pin 760 also lies in a slot 762 in the hook plate 604 (FIGS. 7, 18 and 20) and, in both total and subtotal operations, operates against a cam edge 763 (FIG. 20) for rotating plate 604 to the same position that it occupies for additive operations.

In a subtotal or total operation, the position of the drive gears 444 (FIGS. 13 and 18) must correspond to the sign of the number that is being withdrawn from the accumulator, and that sign is indicated by an indicator 536 (FIGS. 15 and 13) of a well-known type which stands in the position in which it was set by the most recent "fugitive-one" transfer. If the number in the accumulator is negative, the upward-extending arm 540 (FIG. 9) of the indicator 536 stands directly under an ear 768 on the rear end of a bail arm 770 of a bail 772 journalled on a shaft 774. Bail arm 770 carries a pin 777 which lies in a slot 775 of blocking member 654 (see also FIG. 11). Also journalled on the shaft 774 is a lever 776 (FIGS. 8 and 9) having a notch that embraces a pin 778 on the total-subtotal control lever 758 (FIGS. 8, 18 and 22). A spring 780 (FIG. 9) connected between the pin 778 and a pin 782 on a bail arm 771 of bail 772 biases the bail 772 (clockwise as seen in these figures) and normally holds the pin 782 against the lever 776, as seen, for example, in FIGS. 8 and 9. When the lever 758 (FIGS. 8 and 18) is rocked counter-clockwise in either a total or subtotal operation, the engagement of the pin 778 in the notch of the lever 776 causes that lever to turn (clockwise in FIG. 8). The lever 771, being urged by spring 780, tends to follow this movement, but if the number in the accumulator is negative, the ear 768 (FIG. 9) immediately abuts the upper end of the arm 540 of the sign indicator. The bail 772 then is unable to follow the motion (clockwise in these figures) of the lever 776 and so does not tranmsit any motion to the blocking member 654. Consequently, the block 654 (FIGS. 9 and 23) remains clear of the dog 658 and the drive gears 444 are left in their upper position, which is correct for reading out the negative number.

However, if there is a positive number in the accumulator, the arm 540 of indicator 536 will stand clear (to the left in FIG. 9) of the ear 768 of the bail 772. Accordingly, this bail, urged by spring 730, will follow the motion of lever 776 (see FIG. 9). This action swings blocking member 654 (FIG. 11) toward the rear and puts it in position to block the ear 674 of the dog 658. Consequently, as the arm 660 rises, dog 658 rotates about its support 659 and drives the roller 678 rearward for shifting the drive gears 444 to their lower position for the readout of a positive number.

(X) RIGHT SIDE CONTROL KEYS

(1) *Print-only, addition and subtraction*

The simplest machine operation is print-only (N). The machine is normally set for this operation and needs only to have the motor started and the clutch engaged, as by a depression of key 22. The stem of this key carries a pin 810 (FIG. 5) lying above an inclined cam surface 812 on a main clutch control bar 138. When key 22 is depressed, pin 810, acting against cam surface 812, forces the bar 138 forward for releasing the main clutch for operating the machine through a single cycle, as is described in the copending applications previously referred to. Since the ear 400 (FIG. 16) of the front gear pendant is normally engaged by the link 710 (FIG. 6), the operation of the machine, through one cycle, causes the cam 720, through the bellcrank 714 and link 710, to engage the pendant with the selector so that the number in the selector is transferred to the actuator for printing, and then cleared from the machine.

The addition key 14 (FIG. 7) has a stem 814 carrying a pin 816 which overlies a tongue 818 on a lever 820 fixed to the clutch control shaft 186. Accordingly, depression of the addition key 14 rotates the shaft 186 (counter-clockwise in this figure) and, through an arm 140 (FIG. 5), drives the clutch control bar 138 forward for initiating a single machine cycle. Again, because the link 710 (FIG. 6) normally engages the ear 400 of the front gear pendant 390, this action causes the number in the selector to be transferred to the actuator for printing. The pin 816 (FIG. 7) on the add key stem also carries a roller 817 which overlies a cam surface 824 (FIG. 6) on the forward end of the add-subtract link 612. The depression of the add key thus moves link 612 forward and rocks hook plate 604 (FIGS. 6, 7 and 18) the single unit of distance required for putting the machine into an addition operation, as has been described. Consequently, the number in the selector is transferred by the actuator to the accumulator simultaneously with its receipt from the selector.

The subtraction key 16 (FIG. 6) has a stem 832 carrying a pin 834 overlying a cam edge 836 on the add-subtract bar 612. Depression of the subtraction key 16 causes the pin 834 to act against the cam edge 836 for driving the link 612 forward the two units of distance required, rocking the plate 604 (FIG. 18) enough to put the rear pendant control mechanism into subtract operation, as previously described. Key stem 832 (FIG. 6) also carries a pin 838 which lies in a notch 840 of a rearward-extending arm 842 of a bellcrank 844 which carries a pin 848 at the lower end of downward-extending arm 846. As shown in FIG. 7, this pin 848 lies to the rear of a tongue 852 of a lever 850 fixed to the clutch control shaft 186. Consequently, depression of the key 16, through the bellcrank 844 and lever 850, rocks the clutch control shaft 186 (counter-clockwise as seen in these figures) and through lever 140 (FIG. 5) moves the clutch bar 138 forward for initiating a single machine cycle for entering the number from the selector subtractively into the accumulator.

It is to be noted that no interlocks are required or provided between any of the keys 22, 14 and 16, whose actions have just been described. The addition key 14 sets up the same controls as does the print-only key 22 and, additionally, moves the link 612. A simultaneous depression of these two keys 22 and 14 results in an addition operation. Depression simultaneously of the print-only and subtraction keys 22 and 16 similarly results in a subtraction operation. The subtraction and addition operations differ in the distance that the link 612 is moved forward, so that simultaneous depression of the two keys 14 and 16 results in a subtraction operation.

(2) *Total and subtotal*

The total key 30 (FIG. 11) has a key stem 856 carrying a pin 858 which overlies a tongue 860 of a lever, similar to the lever 820 (FIG. 7), and similarly fixed to the shaft 186 so that depression of the total key moves the clutch control bar 138 (FIG. 5) forward for initiating a single machine cycle. Key stem 856 also has an ear 864 overlying the inner bail 866 of two similar bails 866 and 868 journalled on shaft 867. Although it is not shown, the stem of the subtotal key 32 similarly rocks a lever similar to the lever 820 (FIG. 7) and has an ear similar to the ear 864 (FIG. 11) but overlying the outer bail 868. The two bails 866 and 868, rockably mounted on the shaft 867, rock similar levers 870 and 872 (FIG. 11) which, in turn, actuate links 874 and 876 which move forward upon depression of their respective keys.

The total link 874 (FIG. 11) has a slot 880 embracing a pin 882 on an upward-extending arm 884 at the left end of a bail 732. Total link 874 continues rearward and is connected to the upper arm of a hook 786 (FIGS. 8 and 22). Accordingly, depression of the total key 30, in addition to initiating a machine cycle, moves the link 874 (FIG. 11) forward for rocking the bail 732 counter-clockwise and lifting the hook 786 (FIG. 22) for intercepting an ear 788 for setting the rear pendant controls (FIG. 18) for a total operation.

The subtotal link 876, at its rear end, is pinned to an upward-extending arm 888 (FIG. 7) of the subtotal bail 740 (FIG. 6). Arm 888 (FIG. 7) includes an ear 890 which lies behind a pin 892 on the upper end of arm 884 of the total link 732 (see also FIG. 11). Accordingly, depression of the subtotal key 32, in addition to setting the machine into operation, rocks both of the bails 732 and 740 for setting up the rear pendant controls (FIG. 18) for a subtotal operation, as previously described.

No interlock is provided between the total and subtotal keys 30 and 32. If these two keys are depressed simultaneously, the rocking of the two bails 732 and 740 (FIG. 6) would permit a subtotal operation, but the action of hook 786 (FIGS. 8 and 22) limits the motion of lever 758 (FIG. 18) so that a total operation results.

However, an interlock is required between the subtotal and total operations on the one hand, and the subtract operation on the other. The subtract operation requires that the hook plate 604 (FIG. 18) rocks through its greater angle for setting block 652 for lowering the accumulator gears 444, whereas the subtotal and total operations require that the shifting of the drive gears be controlled by the credit balance indicator 536.

One such interlock between subtraction and readout operations is provided by the pin 760 and slot 762 (FIG. 20). For total and subtotal operations, pin 760 moves into part 764 of slot 762 and prevents hook plate 604 from rocking far enough to cause a subtraction operation. And for subtraction, part 763 of the slot embraces the pin 760 for blocking lever 758 from swinging for setting up a total or subtotal operation. But it is desirable that the keys also be interlocked. Therefore, the bail 868 (FIG. 11), which is actuated by the subtotal key 32, includes an upward-extending arm 902 to which is connected a rearward-extending link 904 having a notch 906 underlying a pin 908 extending to the left from the subtraction key 16 (see also FIG. 7). A similar link is connected to a similar arm on the total bail 866 (FIG. 11). Thus when either the total or subtotal key is depressed, its link 904 moves forward and carries the notch 906 out of alignment with the pin 908 so that the link blocks depression of the subtraction key 16. Conversely, the depression of the subtraction key moves the pin 908 into the notches 906 and prevents the depression of either the total or subtotal key. A similar pin 910 may be provided on the addition key 14 (see also FIG. 7) overlying a notch 912 in the two links 904 for similarly preventing operation of the addition key simultaneously with either the total or subtotal key. However, in the machine of the present invention, this last interlock is not required. It will be recalled that an addition operation is set up in the rear pendant control (FIGS. 18 and 19) by a rotation (clockwise in these views) of the hook plate 604, one unit of rotation for disengaging the hook 606 from the pin 608. It will also be recalled that this same motion of hook plate 604 is induced by the pin 760 carried by lever 758 for both the total and subtotal operations. Consequently, the depression of the addition key simultaneously with the total, or the subtotal, key will not alter the total or subtotal operation.

(3) Repeat

The repeat (R) key 20, by itself, controls a repeat-add operation. It is mounted on a bellcrank 916 (FIG. 6) journalled at 917. It includes an arm 918 at its rear end having an inclined cam surface 919 which overlies a pin 920 (FIG. 5) on the clutch control bar 138. Thus depression of the repeat key 20 causes cam surface 919 to drive the pin 920 forward for releasing the clutch and setting the machine into operation. The forward arm 922 (FIG. 6) of the bellcrank 916 carries a pin 923 which lies to the rear of an upward-extending arm 926 of a three-armed bellcrank 930 journalled free on the shaft 186. Another upward-extending arm 927 of the bellcrank 930 lies behind a pin 932 on the add-subtract slide 612. Thus depression of the repeat key, and consequent rocking of the bellcrank 916 (clockwise in FIG. 6), also causes pin 923 to drive against the arm 926, swing the bellcrank 930 (counter-clockwise in this figure), and drive arm 927 against pin 932 for moving the add-subtract bar 612 forward the distance required for initiating an addition operation. The third arm 928 of the bellcrank 930 carries a pin 933 that is spaced below an arm 934 fixed to a shaft 936, for rocking that shaft (clockwise in FIGS 5 and 6). As described in the copending applications, Serial Nos. 138,645 and 117,096 previously referred to, this rotation of shaft 936 sets the machine for repeat operation by preventing the selector from being cleared, preventing the selector from being returned home, and preventing the machine from stopping after a single cycle of operation.

The repeat key 20 and subtraction key 16 may be depressed simultaneously. In this operation, the subtraction key 16 (FIG. 6), through its pin 834 acting against cam edge 836, moves the add-and-subtract control link 612 forward through the greater distance required for the subtract operation. Consequently, it modifies the repeat (R) operation by causing the value to be entered in the accumulator subtractively rather than additively.

The repeat key 20 may also be depressed simultaneously with the print-only key 22, the total key 30, or the subtotal key 32, and will simply repeat those operations and modify them by preventing the selector from being cleared. Consequently, no interlocks are required between the repeat key and any of the other right side control keys, particularly the keys 14, 22, 30 and 32, although interlocks may be provided if they are desired.

(XI) MULTIPLIER-STORAGE, OR MEMORY, UNIT

The multiplier-storage, or memory, unit includes seventeen identical differentially settable storage sectors 970 (FIG. 16) mounted for free rotation on a common shaft 972 supported in the frame of the machine. In FIG. 16, these sectors are shown in their "0" position. Numbers are transferred to these sectors from the actuator sectors 340 by means of actuator pawls 974 pinned at 975 to the actuator sectors. Each pawl has a pair of gear teeth 976 arranged to be lifted into engagement with gear teeth 977 in the lower edge of its storage sector 970.

The mechanism for controlling entries to the memory unit and readouts therefrom, and its operation are disclosed in the copending applications Serial Nos. 138,645 and 117,096, previously referred to.

(XII) MULTIPLICATION CONTROL

The present machine includes mechanism carried on a sensor carriage 1194 (FIG. 16) operable during a multiplication operation for sensing the digits of the multiplier stored in the sectors 970 of the memory storage unit. This mechanism includes a digit sensor 1148 (see also FIG. 17) and a short-cut sensor 1160.

A multiplication control mechanism, shown generally in the exploded perspective of FIG. 28, actuates and responds to the sensors for controlling the multiplication operation according to a "short-cut" plan. A detailed description of this whole mechanism and its operation is contained in the copending applications, Serial Nos. 117,096 and 138,645, previously referred to.

The digit sensor 1148 (FIG. 17) is coupled to a gear 1187 which slides on a square portion of a shaft 1189. The shaft 1189 extends through to the left side of the machine where it carries a pulley 1306 (FIG. 28) about which is wrapped a coil spring 1307 for biasing the digit sensor 1148 (FIG. 17) toward sensing engagement with the sectors 970 of the memory unit. The shaft 1189 also carries a counter ratchet wheel 1190 (FIGS. 28 and 30) which is controlled by a stop pawl 1309 and a feed pawl 1335. The stop pawl 1309 is arranged to be disengaged from the ratchet wheel 1190 for releasing the wheel and the shaft 1189 to the action of the spring 1307 (FIG. 28) for driving the digit sensor 1148 (FIGS. 17 and 16) into engagement with the stepped portion 1162 of the memory sector 970. The distance that the digit sensor 1148 moves for engaging sector 970, and the angle through which the ratchet wheel 1190 rotates, is proportional to the number of times that the multiplicand, in the selector unit, is to be entered in the accumulator in alignment with that particular order of the multiplier in the memory unit. Because of the short-cut plan of multiplication, this number of required entries never exceeds five. The machine enters the multiplicand from the selector once during each machine cycle, and the feed pawl 1335 drives the ratchet wheel 1190 one tooth per cycle for counting these entries.

(XIII) COUNTER RATCHET FEED

Counter feed pawl 1335 is part of a bail member 1336 (FIGS. 28 and 30) journalled at 1337 on a lever 1338. This lever is journalled at 1310, is biased clockwise in these views by a spring 1341, and carries a roller 1339 arranged to ride on a counter feed cam 1340 on the rear drive shaft 110. In the home position of the machine, the pawl 1335 and the lever 1338 are latched in an inactive position by a trident latch 1326, which is journalled on a shaft 1384 supported in the frame of the machine and biased clockwise as seen in FIGS. 28 to 34 by a spring 1330. Thus in FIG. 29 the trident latch 1326 engages an ear 1345 on the lever 1338, and, as shown in FIG. 30, a projection 1346 of the latch 1326 lies under a tip 1347 on an arm 1348 of the bail 1336 for holding the feed pawl 1335 clear of the teeth of the counter ratchet wheel 1190.

During the multiplication operation the lever 1338 and the bail 1336 are free of the trident latch 1326, as shown in FIG. 31. Under this condition the arm 1338 is rocked once each machine cycle by the cam 1340 for advancing the ratchet wheel 1190 one notch (counter-clockwise in these figures) for each revolution of the cam 1340, that is, once each machine cycle. When the multiplication operation is completed it is necessary not only to latch the lever 1338 in its home position (FIG. 29), but also to place and hold the drive pawl 1335 clear of the ratchet wheel 1190. This action is performed by the trident latch 1326 (FIG. 29), which, during the multiplication operation is held in a non-latching position as shown in FIG. 31, and which, at the end of multiplication, is released to the action of its spring 1330. This release will occur near the middle of a machine cycle. When so released, the latch 1326 will first assume a position such as that shown in FIG. 32 with respect to arm 1348 of the bail 1336. Then as the arm 1338 rocks (clockwise in this figure) during the second half of the same cycle, a heel portion 1349 of the arm 1348 rocks against the projection 1350 (FIG. 33) of the trident latch 1326 for lifting the tip 1347 above the projection 1346, as shown in dotted lines in FIG. 33 and full lines in FIG. 34. Then, in the next cycle, when the arm 1338 is again rocked (counter-clockwise in these figures), the trident latch 1326 re-engages the ear 1345 for returning these parts to their home position shown in FIGS. 29 and 30.

(XIV) PRINTING

The printing mechanism of the present machine is of a well-known type, similar to that shown in Patent No. 2,779,267. A number print-wheel 1610 (FIG. 16) is provided for each numerical order of the actuator and is geared to its respective actuator sector 340. Each such print-wheel is carried on a separate print-wheel carrier 1611 journalled on a shaft 1612 and biased by a spring 1613 to drive its wheel 1610 against a printing roller 1614. A print bail rod 1617 underlies the tails 1605 of all of the print-wheel carriers 1611 for controlling them. The rod 1617 is carried by a pair of bail arms 1616, one arm of which appears in FIG. 11, and is controlled by a print control cam 1623 (FIG. 3) which has an abrupt drop-off that lets the print-wheels be driven, under force of their springs 1613, for printing at mid-cycle.

A two-color inked ribbon (not shown) is threaded through guides 1650 of two lifters 1651 and 1652 (FIGS. 26 and 7). The right ribbon lifter 1652 (FIG. 7) is pinned at 1653 to a lever arm 1654 on a shaft 1655 which extends through the machine. The left lifter 1651 (FIG. 26) is similarly pinned at 1656 to a lever arm 1657 which is also fastened to the shaft 1655. A spring 1658 is connected to the pin 1656 for lifting the ribbon. In its lowermost position, the ribbon is below the last printed line. When the ribbon is partially lifted, its upper half is aligned with the print-wheels for printing black. When the ribbon is lifted to its uppermost position, its lower half is aligned with the print-wheels for printing red.

The lever 1657 (FIG. 26) has a lost motion connection with a second lever 1662 which is free on the shaft 1655. This lost motion connection includes a spring 1663 and a pin 1664. The lever 1662 carries a roller 1665 which rides a cam surface 1666 of the actuator gear 376. During each machine cycle, the gear 376 rocks, first, clockwise and then counter-clockwise. Thus, the gear 376 normally holds the ribbon in its lowermost position, but during each machine cycle, releases it to be lifted by its spring 1658 (FIG. 26). As will be explained, the present invention provides stops for permitting only partial lifting of the ribbon when black printing is desired.

(XV) SYMBOLS FOR RIGHT SIDE OPERATIONS

The symbols for the operations controlled by the addition, subtraction, repeat, print-only, total and subtotal keys 14, 16, 20, 22, 30 and 32 (FIG. 1) are provided on a separate print-wheel 1698 (FIG. 12) and controlled by a separate actuator sector 1699 (FIG. 10). This symbol actuator sector is biased (clockwise in FIG. 10) by a spring 1697 for urging a pin 1696 toward engagement with a bail arm 1700 which is provided with a series of stops 1701 for stopping the symbol actuator sector at various positions. Sector 1699 is driven to home position by the main actuator bail rod 344 (see also FIG. 16).

The arm 1700 is part of a bail 1703 journalled at 1702. A second arm 1704 of this bail appears in FIG. 8. For rocking this bail during each machine cycle, a link 1705 is pinned at 1706 to the actuator gear sectors 360 (FIG. 11). The other end of the link has a slot 1707 (FIG. 8) embracing a pin 1708 on the bail arm 1704. A spring 1709 urges the pin 1708 toward the forward end of the slot. Thus during the first half of each machine cycle, as the actuator gear sector 360 is rocked (counter-clockwise in FIG. 11), the link 1705 (FIG. 8) is pulled forward, and the spring 1709 pulls the pin 1708 with it for rocking the bail 1703. At the same time, acutator bail rod 344 (FIG. 10) moves down, and actuator sector 1699, urged by spring 1697, follows it until pin 1696 stops against one of the steps 1701. Stops are provided for stopping the motion of bail 1703 (FIG. 11) in various positions for controlling the stopped position of actuator sector 1699 and print-wheel 1698 according to the symbol to be printed.

The add-subtract control lever 698 (FIG. 8) is provided at its upper end with the ear 702 which lies close under the lower edge of the bail arm 1704. In the home position of lever 698, the ear 702 blocks the motion of the bail 1704 for printing a symbol "N," for indicating a print-only operation. It will be recalled that the machine is normally set for a print-only operation which can be initiated simply by engaging the power drive clutch.

It will be recalled that the addition key 14 (FIG. 1), in addition to engaging the clutch, also rocks the lever 604 (FIGS. 7 and 19). The rocking of lever 604 also rocks the lever 694 (FIGS. 7 and 18) which is fixed to the plus-minus shaft 696, to which the lever 698 (FIG. 8) is also fixed. This rocking of the lever 698 for an addition operation aligns the ear 702 (FIG. 8) with a slot 1715 of the bail arm 1704. This is a deep slot and it permits the bail 1703 the maximum swing for printing a plus sign. For a subtraction operation, the control lever 604 (FIG. 7) and with it, the lever 698 (FIG. 8) are rocked through a greater angle. This action brings the ear 702 (FIG. 8) under an ear 1716 of the bail arm 1704 for stopping the arm 1704 in still a different position for printing a subtraction symbol.

It will be recalled that shaft 560 rocks one amount (counter-clockwise in FIGS. 7 and 18) for a total operation, and approximately twice that for a subtotal. This action rocks the control lever 758. The pin 760 carried by the lever 758 (FIG. 18) acts on a cam edge 762 of the lever 604 for rocking that lever and also lever 694 to the same position it occupies during an addition operation. Thus during a total or subtotal operation, the ear 702 (FIG. 8) is aligned with the deep slot 1715 of the bail arm 1704. The position of the arm 1704, during total and subtotal operations, is controlled by an ear 1717 on the arm 1704, which abuts shoulders on the two lever arms 771 and 776 (see also FIG. 9). When lever 758 (FIG. 8) is rocked, its pin 778 also rocks lever 776 (clockwise in FIG. 8) and bail arm 771 (see also FIG. 9) is urged by spring 780 to follow. If the number in the accumulator is positive, the arm 540 of the credit balance indicator (FIG. 9) will not be aligned with the ear 768 on the bail 772 and consequently that bail will be free to move under the force of its spring 780 for following the movement of the lever 776. Under this condition the smaller swing of the lever 776, in response to a total operation, will swing the end abutment 1718 on the lever 771, and also the abutment 1719 on the lever 776, into alignment with the ear 1717, but the abutment 1718 will control the operation for printing the symbol "T" for a positive total. Similarly, the greater angular motion of the levers 758, 776 and 771 for a subtotal operation will align the shoulder 1720 on the lever 771, and the shoulder 1721, on the lever 776, with the ear 1717, but the shoulder 1720 will control the operation for printing a positive subtotal symbol "S."

If the number in the accumulator is negative, the arm 540 of the credit balance indicator (FIG. 9) will block the motion of ear 768 and prevent the lever 771 from moving substantially out of its home position. This action will hold the abutment 1718 and the shoulder 1720 clear of the ear 1717 so that the abutments 1719 and 1721 will control, for printing the symbols "T" and "S" for negative totals and negative subtotals, respectively.

(XVI) OPERATIONAL CONTROL OF SYMBOLS

It will be noted that the right side symbols are not controlled directly by the keys 14, 30, etc., but rather by the add-subtract shaft 696, the total-subtotal shaft 560, and the credit balance indicator 536, which control the accumulator operations. Because of this arrangement, no extra controls are required for matching the symbols to the many different key operations that are permitted by the omission of interlocks between many of the keys, as previously described.

(XVII) SYMBOLS FOR OPERATIONS BY THE LEFT SIDE CONTROL KEYS

At the extreme right of the print-wheel cluster there is a print-wheel 1738 (FIG. 11) for the left side control keys. It is the only print-wheel for which no actuator sector is included in the main actuator. The drive gear 1739 for this print-wheel is fixed to a gear sector 1740 which, in turn, is driven by a sector 1741 on a shaft 1742 which extends through to the left side of the machine. The mechanism for setting this wheel to the required symbol for each of the multiplication and memory operations is described in the copending applications, Serial Nos. 138,645 and 117,096, previously referred to.

The printing action of this left side symbol wheel is normally blocked for suppressing these symbols during right side operations, such as addition and subtraction. Its print-wheel carrier 1779 (FIG. 11), similar to carriers 1611 for the number print-wheels, carries a pin 1780 which lies in a slot 1781 in a bellcrank 1782 which is journalled at 1783. The bellcrank 1782 includes an ear 1784 which is arranged to abut a pin 1785 on an arm 1786 on a shaft 1800. Pin 1780 and slot 1781 connect the bellcrank 1782 to the carrier 1779 of the print-wheel 1738 so that they rock together. Pin 1785 normally blocks bellcrank 1782 to prevent wheel 1738 from printing, but at times is swung clear of ear 1784 to permit such printing.

(XVIII) CONTROL OF PRINTING SYMBOLS AND SPEED BY LEFT SIDE OPERATIONS

Shaft 1800 (FIG. 11) extends through the machine and at its left end (FIG. 26) is fixed to a lever 1801 which is biased (counter-clockwise in this figure) by a spring 1802. As seen in FIG. 27, shaft 1800 also carries a lever 1803 having at its lower end a pin 1804 which is normally engaged by a latch 1805 which holds it against the action of the spring 1802 (FIG. 26). Latch 1805 is journalled on the same shaft 1384 as a main multiplication lever 1322, and lies over a pin 1806 on the multiplication lever.

The multiplication lever 1322 is rocked (counter-clockwise in FIG. 27) at the beginning of the multiplication operation. This action causes pin 1806 to lift the latch 1805 for disengaging the pin 1804 and releasing the shaft 1800 and the lever 1801 for rotation (counter-clockwise in FIG. 26) under the pull of the spring 1802.

In this action, the lever 1801 cooperates with an ear 1830 on an arm 1831 of the lever 1657. In the home position of lever 1801, the ear 1830 swings clear in a central slot of lever 1801, but when the lever 1801 is swung (counter-clockwise in FIG. 26), the ear 1830 is stopped by a shoulder 1825 for preventing printing, or by a shoulder 1826 for causing printing in black, as will be described. At the same time the ear 1830 permits small and large motions of the lever 1801 and the shaft 1800. Initially, the lever 1801 rocks until a live tip 1827, pinned at 1828 thereon, abuts the ear 1830 of lever 1831.

Although the initial rocking of lever 1801 and the rotation of shaft 1800 are thus limited, the rotation is sufficient for the lever arm 1786 (FIG. 11) to swing the pin 1785 up, and clear of the ear 1784 on the lever 1782, to permit printing by the symbol wheel 1738. Later, during the same first cycle of the multiplication, the roller 1665 (FIG. 26) on the lever 1662 is dropped by the cam surface 1666 of the actuator 376. This action lets the levers 1662 and 1657 (FIG. 26) rock counter-clockwise until the ear 1830 slides off the live tip 1827 and stops against the lower step 1826 on lever 1801. The motion thus permitted the lever 1657 is sufficient to raise the ribbon 1650 for printing black. The end 1659 of the lever 1657 is swung clear of the print bail 1617 for permitting printing. At the same time the rotation of the shaft 1655 rocks the lever 1681 (FIG. 5) for unblocking pin 1675 for permitting paper feed in connection with the printing operation.

Accordingly, the multiplicand in the selector unit is printed during the first cycle of the multiplying operation along with an equals (=) symbol. As the first cycle is completed, the cam surface 1666, through the roller 1665, returns the lever 1657 to its home position shown in FIG. 26. During this action the lever 1801 is still urged (counter-clockwise in this figure) by the spring 1802 so that it holds the live tip 1827 above the ear 1830. Accordingly, as the ear 1830 rises to home position, it lifts the live tip 1827, so that the step 1825 of the lever 1801 slips under the ear 1830.

With the lever 1801 in this extreme position (counter-clockwise in FIG. 26), shoulder 1825 lies under the ear 1830 and blocks the lever 1657 in its home position. Lever 1801 remains in this position throughout the rest of the multiplication operation. Consequently during subsequent cycles of the multiplication operation, the step 1825 prevents rocking of the lever 1657. Under this condition the arm 1659 continues to block the print bail 1617 and the lever 1779 (FIG. 16).

Shaft 1800 also carries a lever arm 1812 (FIG. 7), the lower end of which carries a roller 1813 which lies within the curve of an arm 1814 of a bellcrank 1815 journalled at 1816. A rearward extending arm of the bellcrank 1815 carries a pin 1817 which overlies the operating lever 1818 of the high speed Micro-Switch 62 (see also FIG. 5). When the lever 1812 (FIG. 7) is rocked by shaft 1800 (clockwise in this figure) through the larger angle just described, the roller 1813 cams against the arm 1814 and rocks the bellcrank 1815 (clockwise in this figure) for depressing the switch arm 1818 for energizing the motor 52 through the high speed governor contacts 58 (see also FIG. 14) for driving the machine at high speed. Bellcrank 1815 also has a depending hook 1819 which, in this high speed position, lies under the ear 1716 (FIG. 8) on the control arm 1704 for the symbols associated with the right side operations. Thus, at high speed, the symbol control bail 1703 is blocked, primarily to eliminate the noise and wear of its operation.

The multiplication, or equals (=), bar 1050 (FIG. 27) is moved rearward late in the last cycle of the multiplication operation. As the equals bar 1050 is driven rearward, an ear 1835 drives against a pin 1836 (FIG. 27) on the lever 1803 for rocking it and the shaft 1800 (clockwise in this view). This restoration of the shaft 1800 substantially to its home position, returns the lever 1801 (FIG. 26) to its home position and frees the lever 1657 to permit printing during the total-taking cycle, which follows immediately. In FIG. 11, the pin 1785 on the lever 1786 again blocks the lever 1782 for blocking the printing of multiplication symbols. In FIG. 7, the roller 1813 disengages the lever 1815 for opening the high speed switch 62 and restoring the machine to low speed, and also swings the hook 1819 clear of the ear 1716 (FIG. 8) to permit operation of the right side symbol controls.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

We claim:
1. In combination in a multiplying calculating machine:
   (a) means for cyclically operating the machine,
   (b) printing means operated by the cyclical operation of said machine,
   (c) a blocking lever for blocking a printing operation of said printing means,
   (d) means for biasing said lever out of blocking position,
   (e) a cyclically operating cam which, in the home position thereof, holds said blocking lever in print-blocking position, said cyclically operating cam being operable during the cyclic operation of the machine to release said blocking lever for unblocking the printing means,
   (f) multiplication control means operable for initiating a multiplication operation of said machine,
   (g) a latching lever for said blocking lever,
   (h) means activated by said multiplication control means upon the initiation of multiplication for urging said latching lever to a latching position, and
   (i) a live tip on one of said levers normally engageable with the other lever for preventing said latching lever from moving into said latching position, whereby upon initiation of multiplication, said latching lever is prevented by said live tip from preventing operation of said blocking lever, so that said blocking lever releases said printing means for printing during the first cycle of multiplication,
   (j) the operation of said blocking lever to print-unblocking position, carrying said other lever and said live tip free of each other and permitting motion of said latching lever toward said latching position,
   (k) return of said blocking lever to home at the end of said first cycle of operation being effective to rock said live tip to non-obstructing position, whereby said latching lever engages said blocking lever and holds it in print-blocking position so that printing is blocked during the remaining cycles of multiplication.

2. The combination of claim 1 wherein there is included means operable for increasing the speed of the cyclic operation of the machine, and means operated by the final motion of said latching lever as it moves into latching position for operating said means for increasing the speed.

3. In combination in a counting mechanism for a calculating machine:
   (a) a counting ratchet,
   (b) a drive pawl therefor,
   (c) means for reciprocating said drive pawl through a path suitable for driving said ratchet,
   (d) means biasing said pawl to engage said ratchet for driving it as said pawl is reciprocated through said path as aforesaid,
   (e) and a latch movable to a first position for latching said pawl in an inoperative position disengaged from said ratchet for preventing said pawl from driving said ratchet,
   (f) said latch being movable to a second position for freeing said pawl for engaging and driving said ratchet,
   (g) said latch being movable to an intermediate position,
   (h) said latch, in said intermediate position, being operable to deflect said pawl to said inoperative position as said pawl is reciprocated as aforesaid.

4. In combination in a counting mechanism for a calculating machine:
   (a) a counting ratchet,
   (b) a lever,
   (c) a cyclically operable cam,
   (d) means biasing said lever against said cam so that said cam and biasing means rock said lever according to the motion of said cam,
   (e) a drive pawl for said ratchet carried on said lever,
   (f) means biasing said pawl toward said ratchet for engaging it for driving it as said lever is rocked as aforesaid,
   (g) and a latch biased to a first position for latching said lever to substantially prevent it from following said cam, and for latching said pawl in an inoperative position clear of said ratchet,
   (h) said latch being movable to a second position in which it substantially disengages said lever and pawl for permitting said lever to rock and said pawl to drive said ratchet according to the motion of said cam as aforesaid,
   (i) said latch being movable to an intermediate position in which it is operable, as said lever is rocked as aforesaid, to deflect said pawl from engagement with said ratchet and to latch said pawl out of such engagement, and
   (j) said latch being movable by its bias from said intermediate position to said first position for latching also said lever.

References Cited by the Examiner
UNITED STATES PATENTS

| | | | |
|---|---|---|---|
| 2,388,209 | 10/45 | Friden | 235—91 |
| 2,581,648 | 1/52 | Gienger | 235—91 |
| 2,832,530 | 4/58 | Chall | 235—60 |
| 2,905,382 | 9/59 | Carnacina | 235—60 |
| 2,918,212 | 12/59 | Llorens | 235—60 |
| 2,954,922 | 10/60 | Chall | 235—60.18 |
| 2,969,176 | 1/61 | Anderson | 235—60.18 |
| 2,970,754 | 2/61 | Gang | 235—60 |
| 2,981,469 | 4/61 | Gelling | 235—130 |
| 2,984,411 | 5/61 | Tingley | 235—60 |
| 3,076,597 | 2/63 | Gelling | 235—60 |

LEO SMILOW, *Primary Examiner.*